(12) United States Patent
Tashkandi

(10) Patent No.: US 11,194,559 B2
(45) Date of Patent: Dec. 7, 2021

(54) METHOD AND APPARATUS FOR PLATFORM AS A SERVICE (PAAS) AUTOMATION CONTROL

(71) Applicant: Saudi Arabian Oil Company, Dhahran (SA)

(72) Inventor: Al Alaa N. Tashkandi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/533,367

(22) Filed: Aug. 6, 2019

(65) Prior Publication Data

US 2021/0042104 A1   Feb. 11, 2021

(51) Int. Cl.
*G06F 8/61* (2018.01)
*G06F 8/77* (2018.01)
*G06F 11/36* (2006.01)

(52) U.S. Cl.
CPC .................. *G06F 8/61* (2013.01); *G06F 8/77* (2013.01); *G06F 11/3688* (2013.01)

(58) Field of Classification Search
CPC ........... G06F 8/61; G06F 8/77; G06F 11/3688
USPC ....................................................... 717/101
See application file for complete search history.

(56) References Cited

U.S. PATENT DOCUMENTS

| | | | | |
|---|---|---|---|---|
| 8,006,233 B2* | 8/2011 | Centonze | .................. | G06F 8/75 717/126 |
| 9,009,704 B2 | 4/2015 | McGrath et al. | | |
| 9,342,299 B2 | 5/2016 | Goldstein et al. | | |
| 9,742,838 B2 | 8/2017 | McGrath et al. | | |
| 2006/0117390 A1 | 6/2006 | Shrivastava et al. | | |
| 2009/0249071 A1* | 10/2009 | De Atley | ............ | G06F 21/6218 713/171 |
| 2009/0288078 A1* | 11/2009 | Makonahalli | ............. | G06F 8/60 717/174 |
| 2011/0131564 A1* | 6/2011 | Vidal | ........................ | G06F 8/61 717/174 |

(Continued)

OTHER PUBLICATIONS

Xue et. al., Root Agency: A digital signature-based root privilege management agency for cloud terminal devices, Mar. 2, 2018, Elsvier, Inc., pp. 1-15. (Year: 2018).*

(Continued)

*Primary Examiner* — John Q Chavis
(74) *Attorney, Agent, or Firm* — Leason Ellis LLP

(57) ABSTRACT

Platform as a service (PaaS) automation control systems and methods are provided for automating the deployment of software solutions or middleware into an enterprise or cloud-computing system. The system comprises a distributed network of virtual and physical computing devices arranged in layers including a platform operation layer, development layer, platform administration layer, operating system administration layer and security administration layer. A development automation server and production automation server are configured to selectively advance an automation project from development to production rollout as a function of delegated privilege command (DPC). Using the DPCs, the PaaS automation control system enforces a controlled use of configuration commands needed to implement an automated deployment while limiting access to the infrastructure layer. The PaaS automation control system is further configured to provide an automated and controlled mechanism for development, quality assurance and production rollout.

10 Claims, 14 Drawing Sheets

(56) References Cited

U.S. PATENT DOCUMENTS

| | | | | |
|---|---|---|---|---|
| 2013/0232474 | A1* | 9/2013 | Leclair | G06F 11/3668 |
| | | | | 717/134 |
| 2014/0143767 | A1* | 5/2014 | Nigul | G06F 8/71 |
| | | | | 717/170 |
| 2014/0365649 | A1* | 12/2014 | Giese | G06F 11/3495 |
| | | | | 709/224 |
| 2015/0106791 | A1* | 4/2015 | Karuppiah | G06F 11/3688 |
| | | | | 717/127 |
| 2015/0220734 | A1* | 8/2015 | Nalluri | G06F 21/6218 |
| | | | | 726/23 |
| 2016/0147529 | A1 | 5/2016 | Coleman et al. | |
| 2016/0248698 | A1* | 8/2016 | Sahu | H04L 47/788 |
| 2017/0126787 | A1 | 5/2017 | Martinez et al. | |
| 2017/0147466 | A1* | 5/2017 | Giese | G06F 11/3495 |
| 2017/0315794 | A1* | 11/2017 | Zamir | G06F 8/61 |
| 2018/0349625 | A1* | 12/2018 | Ikram | H04L 63/08 |
| 2019/0129701 | A1* | 5/2019 | Hawrylo | G06F 8/65 |
| 2019/0179631 | A1* | 6/2019 | Benedetti | G06F 8/658 |
| 2019/0196805 | A1* | 6/2019 | Lee | H04L 41/082 |

OTHER PUBLICATIONS

Oh, Sejong, and Seog Park. "Task-role based access control (T-RBAC): An improved access control model for enterprise environment." International Conference on Database and Expert Systems Applications. Springer, Berlin, Heidelberg, 2000.

International Search Report and Written Opinion in Corresponding PCT Application No. PCT/US2020/044933 dated Nov. 12, 2020. 17 pages.

* cited by examiner

METHOD AND APPARATUS FOR PLATFORM AS A SERVICE (PAAS) AUTOMATION CONTROL

FIELD OF THE DISCLOSURE

The present invention relates to systems providing a platform as a service and, more particularly, relates to a system and method for automated control of platform as a service system updates and modifications.

BACKGROUND OF THE DISCLOSURE

Cloud computing is an evolving business model for delivering information technology services; however, security remains a primary consideration in connection with adoption of cloud computing solutions. Cloud computing adoption research has found that security, complexity and relative advantages are significant determinants of adoption by organizations.

In large organizations, hosts, databases and applications are managed by different entities for Segregation of Duty (SoD) purposes. To achieve end-to-end automation, all these parties are involved in the process. This create challenges in terms of responsibilities and security control. Merging these organizations into one is not an option because SoD control is recommended to provide acceptable protection of the executables being used in automation technology, and to provide auditing of automation development and operation.

Platform as a Service (PaaS) accelerates the delivery of services through automation. PaaS involves agile delivery of application servers and database systems for development and production operation purposes. Without PaaS control, cloud computing would not be possible in large organizations.

It is with respect to these and other considerations that the disclosure made herein is presented.

SUMMARY OF THE DISCLOSURE

According to an aspect of the present invention, a method for automating the rollout of software components in an enterprise-wide information technology platform is provided. The method includes the step of receiving a request at a development automation server from a developer access point. The request calls a delegated privilege command (DPC) and identifies a developer and an automation project comprising components and definitions. The method also includes the step of verifying, by a privilege activities management server, that the developer has a privilege level sufficient for calling the DPC. The verification is performed using a set of stored privilege policies that identify DPCs associated with respective privilege levels and identify users associated with the respective privilege levels. The method further includes the step of releasing the components and definitions to a Development Engine in accordance with the DPC. In particular, the releasing step is performed by the development automation server in response to verifying the developer having a sufficient privilege level to call the first DPC.

The method also includes the step of testing, using the Development Engine, the components and definitions through to a completed and linked set of components and definitions. In addition, the method includes the step of releasing the completed and linked set of components and definitions from the Development Engine to a Production Engine. More specifically, the releasing step is performed by the development automation server in accordance with a second received DPC and in response to verifying a user associated with the second DPC as having a privilege level that is sufficient to call the second DPC. The method further includes the step of deploying, using the production engine, the completed and linked components and definitions in a controlled testing environment to validate readiness for enterprise-wide deployment without human intervention. Moreover, the method includes the step of implementing, by a production automation server, the enterprise-wide deployment of the completed and linked components and definitions from the production engine to an operation layer of an enterprise system in response to the readiness for enterprise-wide deployment being validated.

According to another aspect of the invention, a system for automated deployment of software components in an enterprise-wide information technology platform having automated user privilege management is provided. In particular, the system comprises a privilege activities management (PAM) server. The PAM stores a set of unique delegated privilege commands (DPCs) and maintains a set of stored privilege policies. The privilege policies identify DPCs associated with respective privilege levels and identify users having the respective privilege levels. In addition, based on any received DPC, the PAM is configured to determine whether a user calling the received DPC is identified in a stored privilege policy as having a sufficient privilege level for calling the received DPC. The system also includes a security log storage device that is configured to store records of operations performed by the system pursuant to any of the DPCs.

The system also includes an administration system layer which comprises, a development automation server (DAS). The DAS has at least one processor and at least one computer memory and is configured to host a development area. The DAS is also configured coordinate release of an automation project comprising components and definitions from the development area to a development engine. The Administration layer of the system also includes a network attached storage, which is connectible to the DAS. In particular, the network attached storage component includes a development engine and a production engine. The development engine is usable to define the automation project and test the automation project through to a completed and linked set of components and definitions. The production engine is configured to enable pre-rollout deployment of the completed and linked set of components and definitions in a controlled environment to validate readiness for enterprise-wide deployment without human intervention. The administration layer also includes a production automation server, which automates the deployment of the completed and linked components and definitions from the production engine to an operation layer of the enterprise comprising one or more host agents. Deployment is performed by the production automation server in response to the readiness for enterprise-wide deployment being validated.

Additionally, the development automation server is configured to, in response to receipt of a request that calls a first DPC and identifies a developer and the automation project, release the components and definitions of the automation project to the development engine in accordance with the first DPC. In particular, the releasing step is performed by the development automation server in response to verification by the PAM that the developer has a sufficient privilege level for calling the first DPC. The development automation server is further configured to, in response to receipt of a request that calls a second DPC and identifies a user and the automation project, release the completed and linked set of components and definitions from the development engine to the production engine in accordance with the second DPC. In particular, the operation of releasing the completed and linked set of components and definitions to the production engine is performed by the development automation server in response to verification, by the PAM, that the user has a sufficient privilege level for calling the second DPC.

These and other aspects, features, and advantages can be appreciated from the following description of certain embodiments in accordance with the disclosure and the accompanying drawing Figures and claims.

BRIEF DESCRIPTION OF THE DRAWING FIGURES

DETAILED DESCRIPTION OF CERTAIN EMBODIMENTS OF THE DISCLOSURE

Figure 1A:
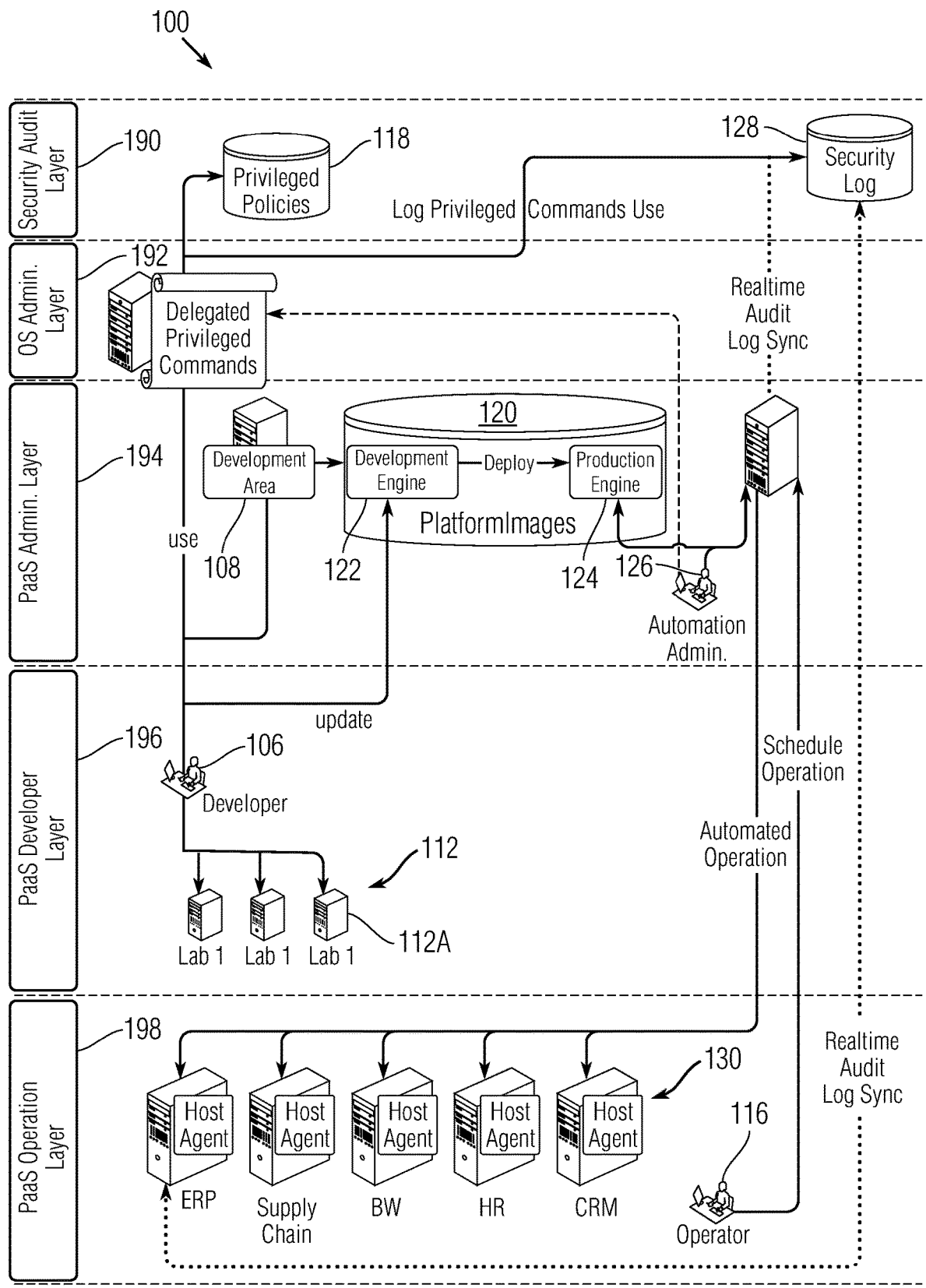
FIG. 1A is a block diagram illustrating an exemplary system for PaaS automation control according to an embodiment of the present invention.

By way of overview and introduction, the systems and methods for platform as a service (PaaS) automation control are disclosed herein for automating the deployment of new software solutions or middleware such as applications servers, database systems, web application servers, and the like. The PaaS automation control system can also be used to manage the lifecycle of the software solutions and middleware by automating their patching and configuration.

In an enterprise computing system scenario, the PaaS automation control system provides a methodology whereby a large enterprise, whose information technology (IT) infrastructure is necessarily stratified and compartmentalized for Separation of Duties (SoD) purposes, can automate the rollout of newly-developed software to the various sub-entities that constitute the enterprise. Similarly, the PaaS automation control system can also operate in a PaaS private cloud computing environment. Accordingly, users of the PaaS automation control system can include enterprise developers or SaaS cloud service providers.

According to an aspect, the PaaS automation system enforces controls on the constituent actors operating within the IT infrastructure, whether computing systems, end-users, application developers, or security administrators. The controls are enforced using so-called Delegated Privileged Commands, which in one embodiment can be an enterprise implementation of the highly popular Linux or UNIX operating systems. Both operating systems are known for their robust enforcement of user permission status regarding reading from, writing to, and executing a hosted encoded entity such as a computer program.

The exemplary PaaS automation system and methods are further described herein in the context of a LINUX or UNIX operating system environment and also in the context of well-known enterprise software solutions such as Oracle and SAP (respectively provided by Oracle Corp. of Redwood Shores, Calif., and SAP SE of Walldorf, Baden-Württemberg, Germany). As may be understood by those of skill in the art, "Root" is the most powerful user in LINUX and UNIX operating systems. Installation of enterprise software mandates using Root power to perform an installation. However, if Root permission is provided to a PaaS customer for the purposes of an installation, they are authorized to do more than software installation and configuration. For instance, the PaaS customer can modify the audit logs of the operating system, modify network configuration.

By way of further example, in a typical PaaS scenario, the customer has control over the middleware and application layer. If the customer needs to customize his virtual machine to, say, deploy new software packages, then he is preferably provided a delegated and approved set of commands to run. More specifically, in software installations like Oracle or SAP, Root privileges can be required to install middleware. However, granting Root to the customer also provides critical authorizations over the infrastructure layer. For that reason, the systems and methods further described herein are provided to enable automated, secure and testable PaaS (or middleware management) automation.

It can be preferable to control not only Root privilege use, but also other user privileges. For example, an Oracle software configuration being deployed by a customer can require the ability to execute certain commands as an "Oracle User." However, Oracle User privileges would allow the customer to access all business data and execute SQL queries. Pursuant to the principle of least privileges control, for the customer to execute a simple configuration in Oracle, only certain commands need to be executed as Oracle User and full Oracle access is not needed. Accordingly, the PaaS automation solutions described herein comprise a distributed system that fits in PaaS cloud computing environment (or an enterprise computing system) to manage application and middleware deployment and lifecycle management. The PaaS automation system enforces a controlled use of installation, patching and configuration commands that are typically associated with a given user privilege level without providing the customer access to all commands and privileges associated with the given user privilege level. The problems associated with providing a customer with privileges beyond what is necessary to perform a given operation can similarly arise for other software and middleware solutions.

Existing operating system control solutions are not sufficient to achieve automated deployment of middleware and applications without granting the customer access to the infrastructure layer. "Sudo" is known solution that has limited functionality and does not fit in PaaS for at least the reason that it is defined locally and is not automated. Typically, a PaaS Cloud Consumer has control over applications and, possibly, some the hosting environment settings. However, a PaaS Cloud Consumer has, at most, limited access to the infrastructure underlying the platform such as the network, servers, operating systems (OS) or storage. Accordingly, through abstraction of the infrastructure layer, the exemplary PaaS automation control system, enables controlled access to infrastructure computing resources. In addition to controlling use of commands and privileges, the PaaS automation control system is further configured to provide an automated and controlled mechanism for development, quality assurance and production rollout that can be used by PaaS users (referred to herein as "customers"). This is unlike existing PaaS systems that do not include quality control management of deployment automation.

FIG. 1A is a high-level diagram illustrating the architecture of a system for PaaS automation control 100 according an embodiment in accordance with the disclosure. The system 100 includes devices and/or functional components shown in FIG. 1A and further described below. The functional blocks and computing devices of the system 100 shown in FIG. 1A can be realized using various forms of virtual computing modules or physical computing systems. Exemplary computing systems can include, for example, servers, blade servers, mainframes, and other appropriate computers and/or networked or cloud-based computing systems because each of these is capable of communicating with remote computing devices, data storage devices and computing networks, including receiving, transmitting and storing electronic information, as well as processing information as further described herein. An exemplary configuration of a computing device is described in greater detail below, in connection with FIG. 13. It should also be understood that, while various functional operations or steps are described herein as being performed by a program, script or other such software-based component, those functions, scripts or software-based components are, in practice, instructions that are executed by a computing system (e.g., one or more physical or virtual processors) and thereby configure the computing system to perform the described operation.

As shown in FIG. A, the system 100 includes at least two computing servers, a network attached storage system, a Privileged Access Management solution (e.g., a LINUX/UNIX operating system) and an Audit Log management system. One of the computing servers is dedicated for development and quality assurance of Automation projects involved in PaaS and is labeled as the Development Automation Server 105 in FIG. A. The development and QA component of the system 100 is configured to enable testing of an automation project in an isolated environment before releasing the automation to a customer. Another computing server is a production server that manages and automates production business solutions running on Cloud Platforms and is labeled as Production Automation Server 110 in FIG. A. The segregation between development/QA and production is preferable to enhance the quality of automation in isolated test environment before moving to the cloud.

The Network Attached Storage system is a salient component of the system 100 and is labeled as PlatformImages 120 in FIG. A. PlatformImages can comprise engines including, for instance, Development Engine 122 and Production Engine 124. In addition, PlatformImages preferably contains repositories of software images required for patching and deployment of middle-wares such as database systems and application servers. Binaries and images required for Application deployment can also be stored in the repositories. Development Engine and Production Engine contain the components required by Platform Automation Server 110 and prescribed definitions. The definitions specify the rules-based constraints of executing automation components enforced by the Platform Automation server. PlatformImages 120 is also configured for distribution of Public Key Infrastructure (PKI) keys and profiles of the Host Agents 130 running on all computing platforms within the system 100. Network Attached Storage can be managed by an Automation Administrator 126 and is owned by Root. Modification of its contents is only possible using Delegated Privileged Commands controlled in the Privileged Access Management server 115.

The Privileged Access Management server 115 shown in FIG. 1A is configured to allow the execution of reviewed and approved privileged commands. In an exemplary arrangement, neither the Automation Administrator 126 or the Developer 106 are permitted by the system 100 to modify the content of PlatformImages 120 without using Delegated Privileged Commands. Delegated Privileged Commands can be reviewed by a system administrator who owns Root Operating system user. More preferably, at various stages of the PaaS automation control process, the Privileged Access Management Server 115 is configured to analyze the commands, which are used by Developer 106 in an automation project, against the Delegated Privileged Commands associated with the Developer to verify whether the Developer has been delegated privileges to execute the commands.

As shown in FIG. 1A, system 100 can include a Security Log storage 128. Preferably, any execution of the Delegated Privileged Commands is logged by the system 100 in a Security Log maintained in the Security Log storage 128. The contents of the definitions and components of the engines also can be written to the Security Logs when released from the Development Area to the Development Engine by the Development Automation Server 105, for example. Also, the contents of definitions and components of the engines are written to Security Logs when deployed from the Development Engine to the Production Engine by the Production Automation Server 110.

Deployment can, in some configurations, be overseen by an Automation Administrator 128. However, as further described herein, deployment can be automatically performed by the system 100 and, more specifically, the Production Automation Server 110. In addition, the Production Automation Server 110 can write the content of definitions to Security Logs stored in Security Log storage 128 when rolled out from the Production Engine 124 to the Host Agents 130 in PaaS cloud Hosts, as further described in connection with FIG. 4.

In connection with provisioning new servers, the Production Automation Server can be configured to include the host agent as part of the image or template of the operating system. This is an enhancement to the standard Linux/Unix system configuration and rollout process. More specifically, after provisioning the operating system (OS), PlatformImages storage can be mounted to the server by the Production Automation Server. In addition, an installation routine is triggered automatically to install the host agent. After successful installation, another routine calls the distributor scripts to add the latest Authentication certificate to the server. The process is followed by calling the distributor scripts for the deployed definitions in the Production Engine 124. At the end, the host agent is re-started and the new server is released to the customer with the latest automation components. Since the Automation certificate is installed in the host agent, the Production Automation Server 110 will automatically discover the new host using a scanning function.

As shown in FIG. 1A, the components of the system 100 can be arranged to include five (5) operational layers, namely, Security Audit Layer 190, OS Admin. Layer 192, PaaS Admin. Layer 194, PaaS Developer Layer, 196 and PaaS Operation Layer 198, as further described herein. In some exemplary arrangements, five human-resource roles can be involved in the operation of the PaaS Automation control system 100 described next. For instance, a Security Administrator can be responsible for the Security Audit Layer 190, an Operating System Administrator can be responsible for OS Admin. Layer 192 and an Automation Administrator 126 can be responsible for the PaaS Admin. Layer 194. Additionally, the term Developer 106 refers to a developer who develops automation and deployment cases for PaaS operations and tests the cases in isolated PaaS test environment or Lab 112. Finally, an Operator 116 refers to a user of PaaS automation. For instance, an Operator can schedule automation operations in the cloud that are related to PaaS, monitor automation logs and report issues to an Automation Administrator 126. The system 100 can be configured to provide the Operator with Operator access via a PaaS cloud portal and is also considered a Cloud services' consumer. This disclosure is directed to certain automated portions of the PaaS control system, described further below, which operate free of operator input.

Segregation of Duties (SoD) between the aforementioned roles is a preferable to achieve secure operation, reliability and control over PaaS. Accordingly, the system 100 can be specifically configured by code executing in one or more processors of a respective server to address SoD without impacting the agility of delivering PaaS services and controlling the automation workflow to avoid or minimize reliance on human resource roles and human operators.

While the foregoing discussion provides a high-level explanation of the PaaS Automation control system 100, exemplary configurations and processes for PaaS automation control that are implemented by the system 100 at various the stages of operation are described next.

Development and Release into Development Engine:

One exemplary process associated with PaaS Automation is the Development Quality Assurance (QA) and control process shown and described in connection with FIG. 2A. The Development and Quality Assurance (QA) Control phase of the automation process begins when a software developer, Developer 106, logs in to the Development Area 108 of the operating system using a Delegated Privileged Command. Specifically, the Developer can be provided with Developer-level access at Operating System level and access to a PaaS Cloud Portal maintained in the Development Automation Server 105. A special "user" can be assigned to the Developer along with access to the Development Area 108 at the operating system layer, for instance, user "auto_developer." Thus, development of an automation project starts at the Development Automation Server 105 with the developer logon to the OS of the Development Automation Server 105 using a Delegated Privileged Command managed by the Privileged Access Management server 115. In connection with this process, the following steps can be performed automatically by the system 100:

1. A Broker command executing in the Development Automation Server 105 communicates with Privileged Activities Management Server 115;
2. Privileged Access Management server 115 verifies that the Developer is a member of the policy issued to auto_developer user. This can occur after performing authentication using, for example, LDAP by checking Privileged Policies database 118. The event can also be stored in Security Log database 128;
3. Upon establishing the session, the development automation server can be configured to log all developer input characters, including control characters, as events in the Security Log storage 128. Accordingly, the Developer's activities in the development area is logged in the Security Log.

Once verified, the Development Automation Server 105 is further configured to provide the developer access in the PaaS Cloud Portal. The Developer access provided at Operating System level allows the Developer to write the logical units, namely, components of the automation project as well as definitions. The Developer access in the PaaS Cloud Portal further allows the Developer to define automation processes and link different components in the Development Engine.

As would be understood by those skilled in component-based software engineering, an individual software component is a software package or software module that includes a set of executable operations/functions or data. Software components can be self-contained and independently executed entities with well-defined input/output interface standards. Definitions comprise a set of instructions that identify components and can be integrated within existing computing systems. There is a one to one relation between definition and component such that each definition has one associated component. In addition, the definition of the component specifies the username that should be used by a server to execute the component. Accordingly, the definition of a given component specifies whether the execution of the given component requires a privileged OS user. For example, a developer can create an automation project by providing any number of off-the-shelf or customized software components (the software package) for integration into an enterprise computing system. The developer can also create definitions that define how the components are to be integrated with the enterprise computing system. In addition to preparing the software component package and corresponding definitions, an automation project can also include components that define the logical process for integrating the software package components into the enterprise computing system. Integrating multiple definitions can be performed using a defined process that is designed at the automation application server level to build complex automation scenarios. Alternatively, an automation can be performed in a single step, called an operation at the Automation Application Server level, wherein one operation is associated with one definition, which is associated with one component.

The Development Area can be referred to as a factory, a virtual space in which an automation developer can build and write their automation code and logic. The factory supports a multi-user work space such that, in the factory, multiple automation developers can work on different project simultaneously and each developer creates his own work space represented by a directory.

In an exemplary configuration, the factory can include 3 areas: Factory Management, Components Development, and Definitions Development. The Factory Management Area is owned by root and, preferably, cannot be modified by a developer. Inside it is stored a factory management script, which is owned by root and cannot be modified by the developer. The factory management script is a dedicated privileged command ("DPC") and, as such, its integrity is protected by a hash and has preferably been reviewed by security and root admin and approved to automate the management of the factory in a secure way. The Components Development Area can be owned by an Automation Administrator user, for example auto_admin, however, the group of this Area can be owned by developer. Moreover, using unix permissions, read, write and execute are allowed for the owner and the group. Accordingly, a developer can modify the content of Component Development Area but cannot remove the complete Component Development Area (due to the ownership of the root directory of Factory by auto_admin). The permission for the Component Development Area is read, write and execute for the owner and read and execute only for the group and others. The Definitions Development Area is similar to the Components Development area in terms of security control and, in this area, the developer is able to write definitions for the automation project before moving them to development engine using a delegated privileged command as further described below.

Figure 1B:
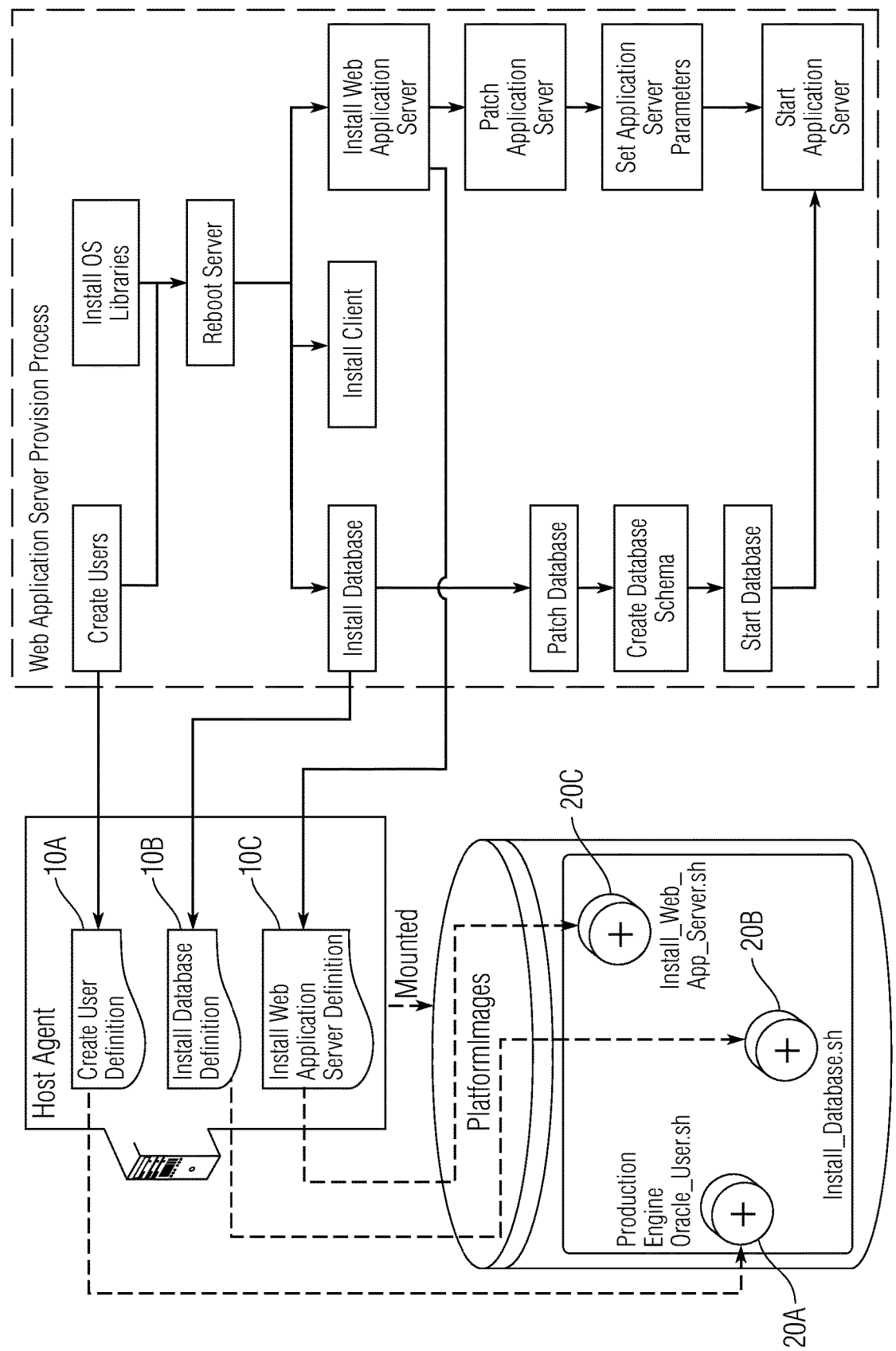
FIG. 1B is a block diagram illustrating an exemplary web application server provisioning process implemented using the system for PaaS automation control according to an embodiment of the present invention.

As an example, an automation can be defined in an Automation Application Server for provisioning a web application server. Provisioning a web application server requires orchestration between steps and operations, for example, as shown in FIG. B, which is a process flow diagram illustrating exemplary steps for provisioning a web application server. It should be understood that the process 50 depicted in FIG. 1B is provided as an example and does not necessarily reflect an actual implementation of web application server automated provisioning.

For each rectangle in the diagram, there is an associated definition that is made available in host agents of all servers. The definition defines the component or log to be executed at each step. More specifically, definitions consist of parameters to define what is executed at a specific step. For example, an Install Database Definition can comprise the parameters listed below:

Name: Install Database;
Username: Oracle;
Component: /PlatformImages/Engine/Components/Production/Live/Database/Install.sh $[DBName];
Description: Install Oracle database;
Platform: Unix;

The Name parameter specifies the definition name and the Username parameter specifies which user should be used by OS to execute the component. The Component parameter specifies the component to be executed, wherein components are preferably located in the Production Engine of PlatformImages for control purposes. The Description parameter provides documentation for the definition. The Platform parameter specifies the operating system supported by the component which, in this example, the command supports UNIX operating system.

Continuing with the exemplary web application server provisioning process, definitions are distributed to cloud servers, wherein each server in the cloud preferably has a host agent. As shown in FIG. 2B, the definitions 10A-10C are part of the Host Agent 130B within the PaaS customer server. The components 20A-20C, which correspond to the definitions 10A-10C are available in the engine. As such, FIG. 1B also illustrates the PlatformImages filesystem mounted on the PaaS customer's server pursuant to the provisioning process 50. As further described herein, an Automation Application Server orchestrates the process and defines the dependency between process steps. Moreover, the process is managed, triggered and monitored by the Automation Application Server.

Returning now to FIG. 1A and the exemplary process for developing and deploying an automation case using the system 100, once the Developer finishes development at the Operating System level, the system 100 is configured to control the release of the work from the Development Area to the Development Engine for both the components and definitions. The release can be performed by the Development Automation Server 105 using Predefined Privileged Commands to ensure Separation of Duties and such that the content of the components and definitions are logged in Security Logs 128 and can effect automation of the movement of code from the Development Area 108 toward the Production Engine.

Figure 2A:
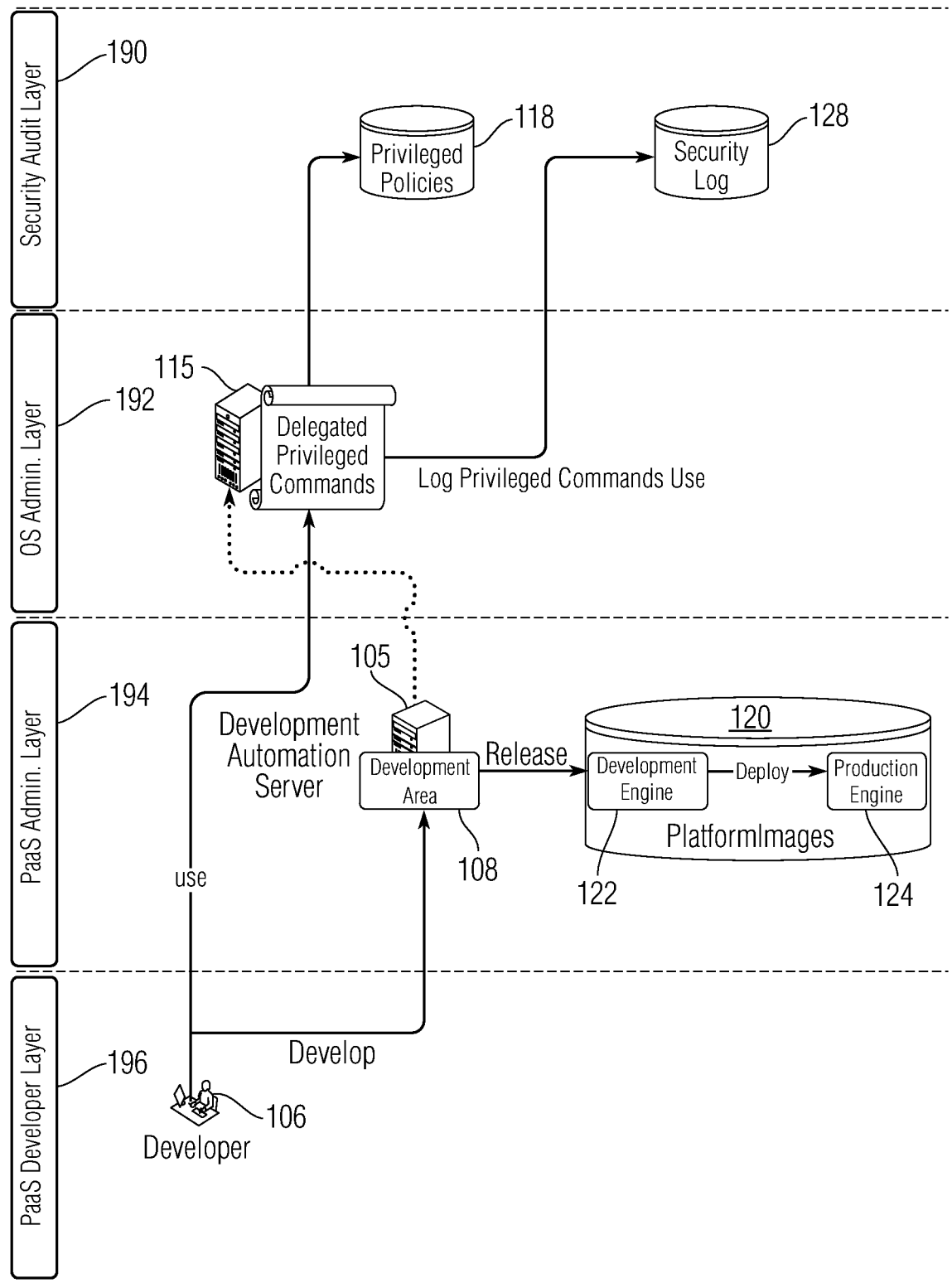
FIG. 2A is a block diagram illustrating an exemplary configuration of the PaaS automation control system and subroutine for PaaS automation control according to an embodiment of the present invention.
Figure 2B:
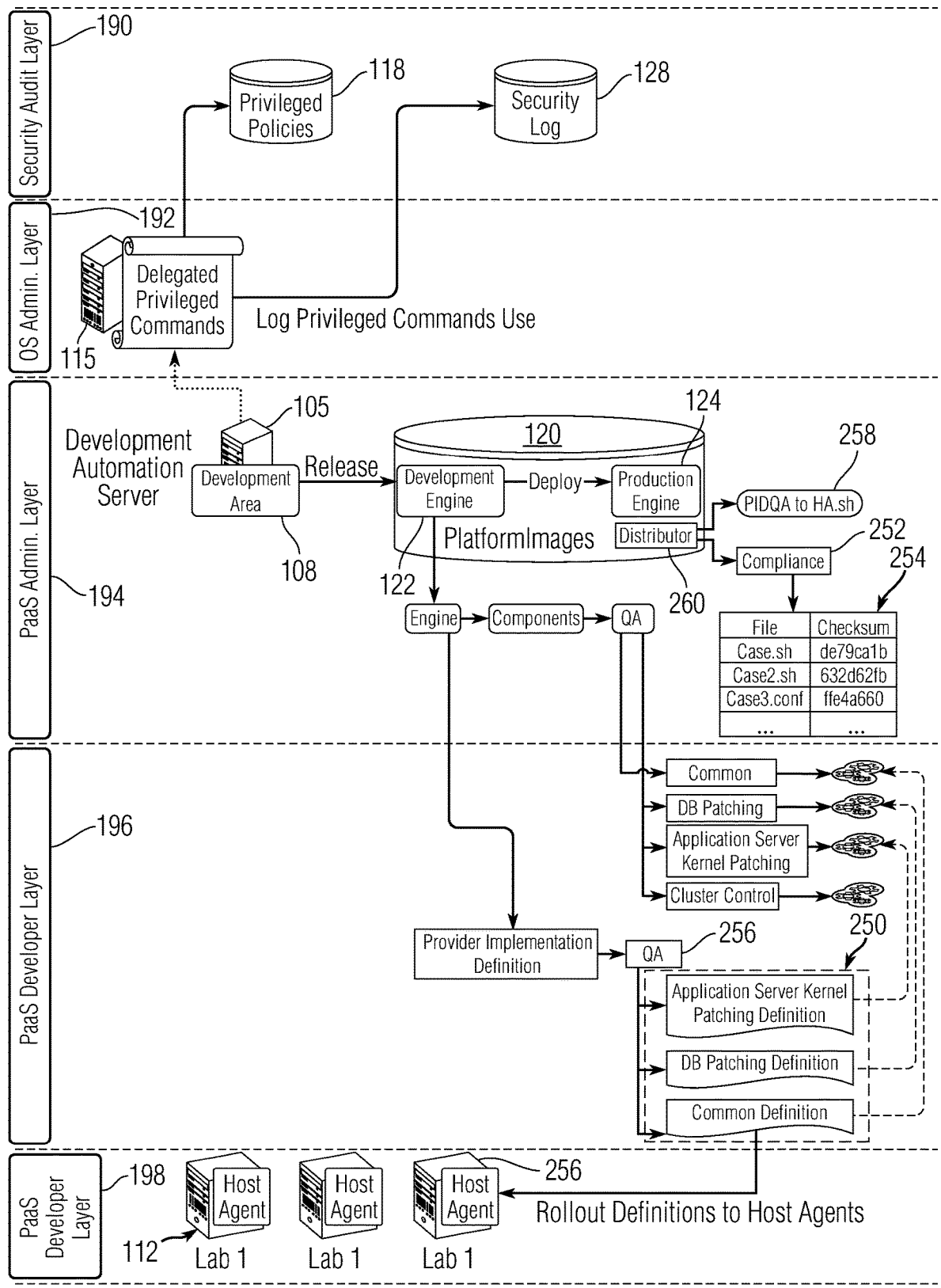
FIG. 2B is a block diagram illustrating an exemplary configuration of the PaaS automation control system and subroutine for PaaS automation control according to an embodiment of the present invention.

FIG. 2A is a block diagram illustrating components of the system 100 and their inter-operation in furtherance of the development of an automation project (or "work") and its initial release in accordance with the exemplary PaaS automation process. In this exemplary implementation, when the Developer is finished with component development in the Development Area 108, the work can be owned by a user, say, the auto_developer user. To push the work to the Development Engine 122, where various QA tests can be implemented, the Development Automation Server 105 can automatically perform the following steps using a Delegated Privileged Command specifically defined to manage the factory.

1. A Broker command is used by the Development Automation Server 105 to check if the Developer is a member of the policy allowing for the execution of the factory management script located in the Development Automation Server 105. This event can be logged in Security Log storage 118. For example, the input for the script is in the format "component name, the automation use case name."
2. The script is executed by the Development Automation Server 105 as Root using the Broker command.
3. The Factory management script configures the Development Automation Server 105 to verify if the component name is correct and available in Component Development Area 108.
4. In particular, the script scans definitions directory inside Development Engine for a reference for this component. If the particular component requires execution by a privileged user, a component checksum is checked using a checksum Compliance program. That compliance program verifies that the component name and its checksum, which can be calculated from the component being released, is listed within the directory. If it is listed, the system can proceed with the component. Otherwise, it is rejected.

5. Similarly, the Factory management script configures the Development Automation Server 105 to verify if the use case name is available in the factory. Otherwise, a use case name is defined under Engine/Components/QA by creating operating system folder representing the use case. The folder can be created such that it is owned and protected by Root.

6. The script echoes the contents of the file to be stored in the Security Log storage 118. In one exemplary configuration, all components are stored under standard location in inside the development engine. For example, the standard location can be /PlatformImages/Engine/Components/QA/<Use Case Name>/<component name>. Components can be grouped based on the use case or automation projects. In addition, some of the components can be reusable by different project and stored under a shared location based on developer design and choice /PlatformImages/Engine/Components/QA/Common. As stated earlier, <Use Case Name> is passed as a parameter or argument to DPC. The operation is also logged because the script is executed as Delegated Privileged command using Broker command, which logs all standard output of the executed script. The ownership of the component is modified to be Root. The use case directory ownership is Root. Permission is modified to 755, for example. 755 represents the permission at OS level. Files and folders in UNIX/LINUX operating systems have username and group ownership. In this example, the username of the owner is root. In UNIX, file permission 7 means allow read, write and execute; 6 means allow read and write; and 5 means allow read and execute. In this context, 755 means allow read, write and execute to owner which is root; allow read and execute to the group owner; allow read and execute to other.

With respect to step 4 of the DPC routine described above, the checksums for components that are listed in the directory are preferably generated and updated with authorization from the owner of the privileged account, for instance, OS administrator or root. For example, if an automation developer needs to update the list of approved components and definitions, the developer can communicate the latest version of a definition and component for approval by an OS administrator. Upon approval, the system proceeds to calculate checksums for the component and definition based on their file contents and records the checksum and names in the list.

Accordingly, during the execution of the DPC, particularly step 4, a subroutine verifies if the component requires privileged user for execution. This is done by checking the corresponding definition if it exists. If the corresponding definition is not released yet, the verification is bypassed. If the definition exists but no privileged user is required, the verification is bypassed. If the definition exists in the development engine and privileged user is specified, the checksum of the component that is being pushed from the factory is calculated and compared to the corresponding checksum in the directory. In this last case, there are three sub-scenarios and outcomes: 1) If the checksums of the component in the factory and its definition in the Engine match existing entries in the checksum database, the component is released to the development Engine. 2. If the checksum of the component in the factory does not match an existing entry in the checksum database, the component is rejected; 3) if the checksum of the component in the factory matches an existing entry but the corresponding definition does not match an existing entry, the component is rejected.

As noted, an automation case can also include definitions, which can be developed in the Development Area 108. In an exemplary implementation, when the Developer finishes definition development in Definition Development Area 108, the work can be defined as being owned by auto-developer user. To push this work to Development Engine 122, where various QA tests can be implemented, the following steps can be performed automatically by the Development Automation Server 105 using a Delegated Privileged Command that manages the factory.

1. Broker Command is used by the Development Automation Server 105 to check if the Developer is a member of the policy allowing the Developer to execute a factory management script in the Development Automation server 105. This event can be logged in Security Log storage 118. For example, the input for the script is definition name.

2. The factory management script is executed by the Development Automation Server 105 as Root using the Broker command.

3. The Factory management script preferably configures the Development Automation Server 105 to verify if each definition name is correct and available for use in the Development Area 108. More specifically, it verifies that the following attributes are available:
   a. name of the definition
   b. The component name to be executed under Development Engine.
   c. Username to execute the associated component.

3. The script further configures the Development Automation Server 105 to verify if a privileged user, for example Root, is required to execute the component. If a privileged user is required, the script further calls a Compliance program protected as Root in the PlatformImages 120. More specifically, the Compliance program can be provided access to a table of definitions and components and associated checksums, which can be generated using MD5SUM operating system command by user OS Admin, for example. The checksum table can be maintained, for example, in the PlatformImages 120.
   a. In particular, the script can check if the component was released into the Development Engine 122. If so, its checksum can be verified using the Compliance program against the checksum table that contains filenames and associated approved checksums.

4. If successful, the script configures the Development Automation Server 105 to echo the contents of the definition file to be stored in the Security Log database in Security Log storage 118. Furthermore, the ownership of the definition can be modified to be Root and the use case directory ownership can be set to Root. Permission can also be modified to 644, for example. As noted previously, this number represents operating system permissions and, specifically, 644 means allow owner, which is root, to read and write, allow group to read and allow other to read. Unlike components, definitions are read during run time to determine which component should be executed.

Definitions can be stored in a standard location within the development engine, for instance, under/PlatformImages/Engine/Definitions/QA. Unlike components, where there can be a logical grouping, definitions can all be located under one directory. Definitions are used by a Host Agent to identify the allowed actions in the server by the Automation server. For the host agent, definitions represents the list of allowed operations (components) on that host. No need for logical grouping at this level. As such, definitions are preferably stored in the Host Agent to be usable. Nevertheless, definitions can be located initially in the engine to simplify the audit and distribution to all servers in the cloud.

The foregoing exemplary process for automated and controlled transfer of an automation case into the Development Engine 122 can be further enhanced by automated generation of compliance checksums. Automated generation of compliance checksums can be performed if the checksum validation fails, e.g., if there is no name/checksum for the component listed in the directory or a checksum in the list does not match the component being verified. Generally, the process for generating a compliance checksum can involve scanning the contents of the components and checking if contents are whitelisted or not blacklisted and calculating a checksum in the event that component contents are whitelisted or otherwise not blacklisted. If it is gray, neither whitelisted nor blacklisted, then a manual action can be required. More specifically, the Development Automation Server 105 can be configured to determine whether a component is whitelisted, blacklisted or grey, by scanning the component lines, extracting the command, comparing it against a whitelisted or blacklisted table. This table can be stored in PlatformImages 120 or Privileged Activities Management Server 115, if further control is required. The file representing the table can be protected by Root and checksum in Root Compliance Secret server. The exemplary process for automatically generating a compliance checksum for a component can be considered whitelisting the component.

Development Release into QA Testing:

When the Developer's work is released from the Development Area to the Development Engine, the system 100 can be further configured to allow the Developer to conduct testing of software-implemented automation units using a pool of Lab resources 112, as shown in FIG. 1A. For instance, after the release of Operating System components and definitions, the implemented automation units represented by components can be configured and tested by the Developer within the pool of Lab resources 112 at the PaaS Development Layer 196. The testing can be repeated until the PaaS Automation use case is completed successfully.

FIG. 2B is a block diagram illustrating components of the PaaS automation control system 100 and their inter-operation in furtherance of releasing work and QA testing within the Development Engine 122 in accordance with the exemplary PaaS automation process.

To perform QA testing of an automation project in an isolated environment away from the resources of cloud customers or production systems, the system 100 is preferably configured to include a pool of lab resources 112 that are available to the Developer 106. For the purposes of testing, definitions are pushed to the host agents of respective lab resources, which can include virtual and physical machines or computers. The Host Agents can be configured to be owned by Root, for example, and control which action can be performed by the automation control system on that specific host (resource) according to definitions.

In an exemplary arrangement shown in FIG. 2B, the system 100 can be configured to enable testing and pushing of definitions to the host agent 112A according to the following steps:

1. Definitions can be pushed by Development Automation Server 105 from Development Engine 122 to Lab Resource Host Agent 112A using a Delegated Privileged program, for example, PIDQAtoHA.sh 258. This Delegated Privileged Command can be executed by a Broker program. In particular, the Broker program configures the server 105 to communicate with Privileged Access Management server 115, verify the permissions to execute the delegated privileged program in that specific lab resource 112A and record the event in the Security Log storage 118. In this exemplary arrangement, the DPC can be located in platformImages/Distributor area 260, however, the actual execution of the DPC can occur in the Lab server. More specifically, the DPC policy specifies which hosts or server the DPC is allowed to run on and specifies which user is allowed to execute the DPC. In this context, the object is to push the definitions to the host agent to add additional set of operations, or components, that are allowed to be executed by the Development Automation Application Server. In other words, the operations is performed to update the target host with a set of allowed executable components by adding additional definitions to its Host Agent. Accordingly, the execution of the DPC happens on that host, the lab.

2. Delegated Privileged command scans the definitions 250, which can be stored by the Development Engine 122 but are conceptually shown in FIG. 2B as a separate from the Development Engine 122. The scanning of definitions can be performed in either of two modes, individual or mass. In the individual mode, the name of the definition can be provided to the Delegated Privileged command. In the mass mode, as further described herein, the parameter is not necessarily required.

3. Each definition is checked to determine if it requires privileged execution using privileged user, for instance, Root. If yes, a Compliance Program 252 is called. Compliance program can be available in a secure directory called Distributor 260 in PlatformImages 120 and is owned by Root. Compliance Program also checks if a checksum is available for the definition. If successful, it extracts the component name in the definition. The component checksum is also calculated by the Compliance Program and the output is compared against the checksum table 254.

4. If successful, the definition is echoed to capture the content of the definition in the Security Log 118. Moreover, all standard outputs of scripts or commands executed with Broker as Delegated Privileged command are preferably logged in Security Log 118.

5. If successful, delegated privileged script communicates with the Host Agent 112A of the lab resource, verifies if Host Agent has an authentication certificate for integration with the Development Automation Server 105. If not available, it calls a delegated script to upload the authentication certificate from PlatformImages Distributor area to a given Host Agent Certificate Path.

6. Delegated privileged command verifies the profile of the host agent and compares it against the latest QA Host Agent profile version. If not matched, it is replaced with the latest version available in Distributor area of the PlatformImages. The profile defines parameters of the Host Agent including control parameters. For example, it can specify: the type of authentication to the Host Agent; the trace level for events; where events should be stored; the trusted authentication certificate used by Automation Application Server to login to a managed host; the list of ACL (Access Control List) of trusted IPs that can connect to the Host Agent. In addition, to monitor events on the Host Agent which is another important component, the profile can be defined to send Host Agent events to an OS standard log under/var/log. As such, by default, all cloud servers sync OS standard Logs to 128.

7. Delegated privilege command verifies if the directory for storing host agent definitions is available. If not, the directory can be created and assigned Root ownership and assigned a 750 permission on that directory.
8. Definitions are copied from QA directory, labeled 256 in FIG. 2B, of the Development Engine toward Host Agent definitions directory.
9. Definitions are assigned Root ownership with 640 permissions. 640 means read and write by owner and read by group. For example, the owner of the definition is root in UNIX/LINUX and the group is Host Agent group. Definitions in host agent are critical because it specifies which action are allowed to be executed in a specific host from Automation Application Server. Giving permission to non-privileged account to modify it would introduce a security risk. Accordingly, assigning ownership and permissions achieves salient objectives of the invention, namely, to provide a secure and automated mechanism for updating the definitions in the host agent after going through review and QA check.
10. Delegated privileged command then restarts the host agent 112A automatically to register the definitions, enable the new authentication certificate, if replaced or added, and activate the Host Agent Profile if replaced.

In the foregoing example steps 1-10, the DPC policy specifies which hosts or server the DPC is allowed to run on and specifies which user is allowed to execute the DPC. In this context, the system is configured to push the definitions to the host agent to add additional set of operations, or components, that are allowed to be executed by Development Automation Application Server. This process is updating the target host with a set of allowed executable components by adding additional definitions to its Host Agent. For that reason, the execution happens on that host, the lab. However, in an alternative scenario, namely, the automated scenario described in page 17, the process is orchestrated by Development Automation Application Server. On the other hand, in this context described here, the actual execution happens on the lab server.

Figure 2C:
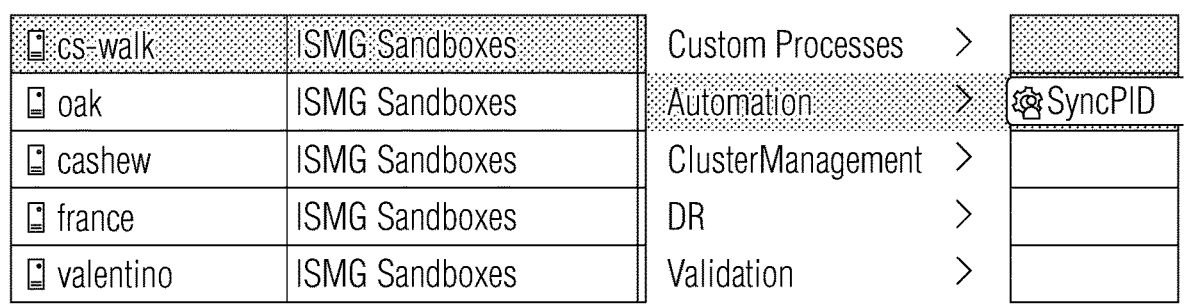
FIG. 2C is a screen-shot of an exemplary user interface displayed at a user-terminal of the PaaS automation control system according to an embodiment of the present invention.

In another exemplary configuration, to simplify the rollout to many Lab resource servers for the purpose of QA especially if there are multiple projects running with several QA testings that each involve multiple lab servers (virtual machines/VMs or servers), the exemplary QA rollout process can be automated at a higher level thereby providing a mass QA rollout functionality. In particular, a definition and component can be created to call PIDQAtoHA.sh and can be distributed to all lab machines 112. Since this definition and component requires Root permission, it can be previously reviewed and approved within the OS admin Layer 192 and distributed. Thus, the automated release process can be implemented as followed:

1. A component, Sync PID, can be provided at the Development Automation Application Server 105. Sync PID can be executed on all lab resources available to a Developer in the Development Automation Application Server, for example, upon clicking a button provided in a graphical user interface shown in FIG. 2C. When called in the Development Automation Application Server, Sync PID is configured to call the Host Agent 112A of the lab server.

Sync PID is an automated process that reflects definitions in the Engine to Host Agent definitions directory. Production engine stores definitions that were tested and approved in a central shared storage to simplify the audit and management of these definitions. Sync PID is responsible for syncing the definitions in the central storage with the list of definitions in the host agents. Sync PID can also be implemented at production level. In particular, Sync PID in Production Automation Application Server can sync all definitions in Production engine to all Host Agents in the cloud.

Sync PID running in the Development Automation Application Server syncs definitions from Development Engine while Sync PID in the Production Automation Application Server sync definitions from Production Engine. The particular operation is controlled by a parameter passed to the definition from Automation Application Server. For instance, QA can be passed as the parameter from the Development Automation Application Server and, in response, the associated component calls PIDQAtoHA.sh. In the production context, Prod can be passed as the parameter from Production Automation Application Server such that the same component calls PIDtoHA.sh to sync definitions from Production engine.2. Definition is read by the Host Agent 112A to execute the Sync PID component in the Development Engine.

3. Sync PID component calls PIDQAtoHA.sh script located in PlatformImages/Distributor folder to achieve steps 1 to 10 described above in connection with FIG. 2B.

In addition, to mitigate the risk associated with the streamlining of the automated release process, all actions performed at the application servers can be logged in the Security Log database 128.

The next steps of the exemplary PaaS automation process include the Production Deployment and Rollout subroutines. Production Rollout Control provides a gateway to prevent the distribution of previously-verified automation units if a checksum fails.

Generally, automation management servers can be agent-less or agent based. In the exemplary embodiments described herein, an agent-based automation management approach is implemented. The advantage of agents is providing more controlled access to the host. The list of permitted actions are limited by the definitions on the host and no other software component can be executed centrally. In addition, for a definition to be approved and added, it must go through the exemplary integrity verification processes described above. In addition or alternatively an agentless automation management approach can be implemented. An agentless automation management server has full access to execute any action and generally provides a lesser level of control. If automation application server security system was exploited, intruder can cause severe damage to wide range of cloud resources because actions are not limited. Accordingly, the exemplary embodiments of the invention described herein provide multiple layers of protection and control to achieve more optimal, yet automated, security control.

QA to Production Deployment Process:

An exemplary process for production deployment control implemented using the system 100 is further described next. After the system 100 receives a confirmation of a successful automation test the system 100 can be configured to verify compliance with standard automation requirements, check logs and check performance results. The system 100 can perform the requisite verifications automatically and initiate the rollout process. In addition, the system 100 can be configured to prompt the Automation Administrator for verification. Once an approval is returned, the system 100, via code executing in one of the processors, can be configured to further require that the Developer submit proper Documentation and Procedures, say, to Operators. Once documentation is released and published, the Developer can be prompted by the system 100 to go through a change management process and submit a change request. Once approved by Automation Administrator and IT management, components and definitions can be Deployed in Production Engine using Predefined Delegated Privileged Commands.

Figure 3:
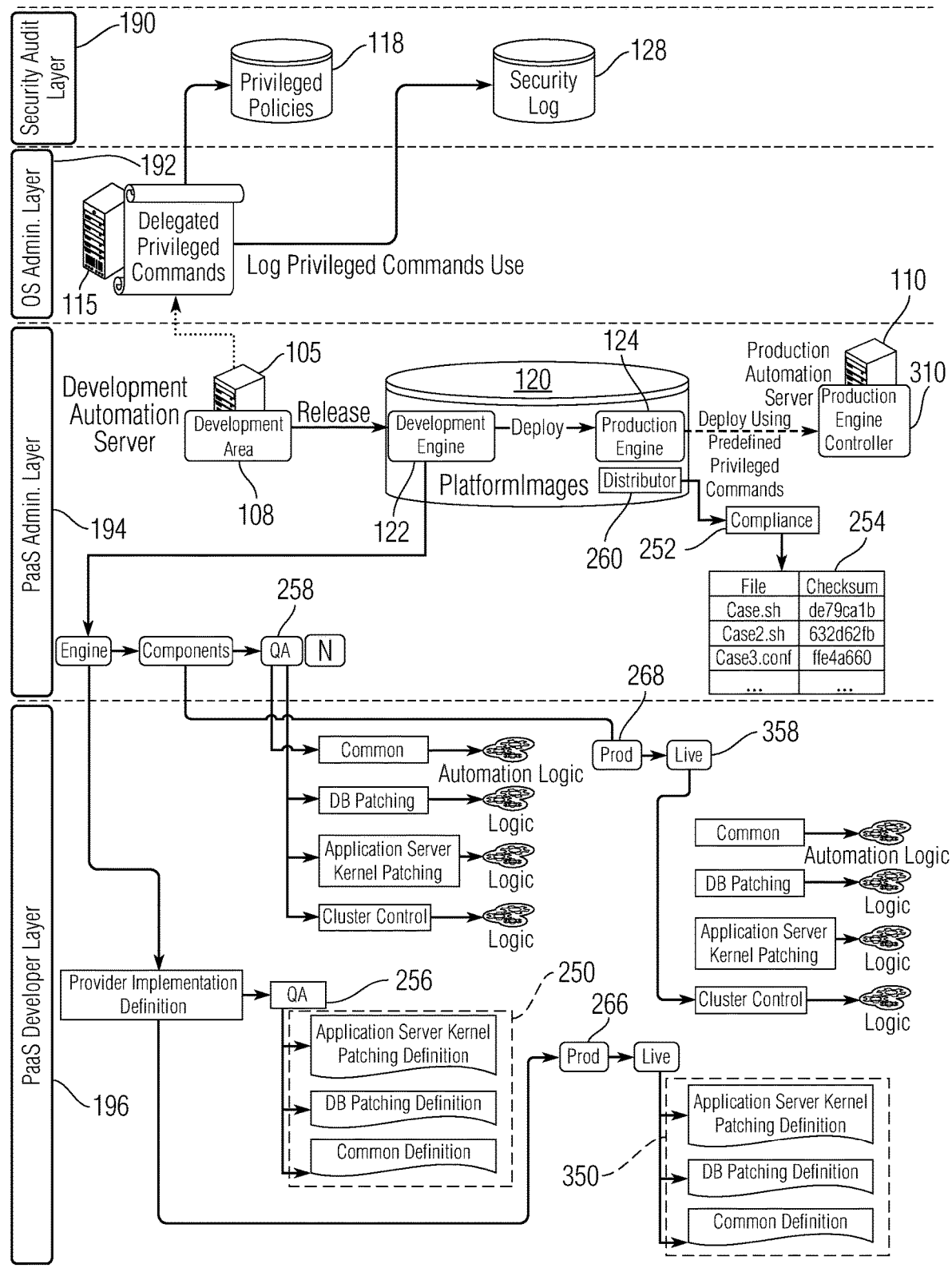
FIG. 3 is a block diagram illustrating an exemplary configuration of the PaaS automation control system and subroutine for PaaS automation control according to an embodiment of the present invention.

FIG. 3 is a block diagram illustrating components of the system 100 and their inter-operation in furtherance of releasing a QA tested automation case through to deployment within the Production Engine 124 in accordance with the exemplary PaaS automation process.

After completing QA testing and demonstrating successful implementation of the automation in lab resources, the system 100 can be configured to control deployment of the new automation. In some arrangements this process can include transmitting a request to the Automation Administrator 126 to approve the deployment of the new automation case. Similar to a Developer, the Automation Administrator can be required by the system 100 to logon to the operating system of the Production Automation Server 110 using a user/permission suitable for approving a deployment, say, user auto_admin. In addition or alternatively, an automation case deployment can be carried out by the system 100 without administrative oversight.

In an exemplary scenario for deploying an automation case, the shared filesystem of PlatformImages 120 can preferably be mounted on the Production Automation server 110 with write permission. To deploy an Automation case in the Production Engine 124, the following steps can be performed by the system 100 automatically using one or more Delegated Privileged commands, which are stored and implemented by the Production Automation server 110 and configured to manage the Production Engine:

1. To deploy components that have been tested and stored, for example, under Engine/components/QA/<Use Case>/, the following operations can be performed by the system 100, particularly, the Production Automation Server 110:
    a. Broker Command checks if the automation administrator is a member of the policy permissioned to execute the Production Engine Controller script, which is located in the Production Engine Controller 310. As in the factory, which is implemented only in Development Automation Server, Production Engine Controller is protected and restricted in Production Automation Server. Whereas the factory DPC can be executed by automation developer, the Production Engine Controller DPC can be executed or triggered by Automation Administrator.
    b. The Event is logged in Security Log storage 128.
    c. For example, the input for the script is in the form "component name, the automation use case name" and the script can be executed as Root using the Broker command.
    d. The Production Engine Controller script verifies if component name is correct and available under the Engine/components/QA directory 258, which is maintained by the Development Engine 122.
    e. The script scans the definitions directory 256 inside the Development Engine 122 for a reference for this component. The existence of a reference to the component in the directory indicates that testing was conducted and its absence indicates testing was not conducted. If component requires execution using privileged user, the component checksum is checked using the Compliance program 252 which verifies that the component name and its checksum in table 254 matches with the current state of the component contents. If it does not match, it is rejected.
    f. The script performs a backup of the current Live Components 358. A copy of Live can be created to provide versioning control and maintain old versions of overwritten components, for example, under Engine/Components/Prod and the New folder can be named BK.<date_HHMMSS>. Furthermore, the backup can be saved with Root ownership.
    g. The script also verifies if the use case name is available in the Production Engine. Otherwise, a use case name is defined, say, under Engine/Components/Prod/Live 358.
    h. The script echoes the contents of the file to be stored in Security Log database 128.
    i. The component can also be copied to a directory in the production engine, directory Use Case Name, for example, using cp operating system command with (-p) option to maintain file attribute at QA state like ownership and last modified timestamp.
    j. The ownership of the component is maintained as Root. The use case directory ownership is Root. Permission of Use Case directory is modified to 755.
2. Similarly, to deploy definitions that have been tested under Engine/PID/QA/directory 256, the following operations can be performed by the system 100, particularly, the Production Automation Server 110:
    a. Broker Command checks if the automation administrator is a member of the policy authorized to execute the Production Engine Controller script located in the Production Engine Controller 310 by communicating with Privileged Access Management server 115. The broker command also communicates with Privileged Access Management server 115 to verify a checksum of the Production Engine Controller script.
    b. The input for Production Engine controller script can be the Definition Name only.
    c. Production Engine Controller script located in the Production Engine Controller 310 verifies if definition name is correct and available in Engine/PID/QA/directory 256.
    d. The script verifies if a privileged user, for example Root, is required to execute the component that is defined in the definition. If a privileged user is required, the script calls a compliance program 252, which is protected as Root and, in this instance, is provided in the Distributor 160 within PlatformImages. Compliance program has a table 254 of definitions and components and associated checksums generated using md5sum operating system command by OS Admin. The current checksum of the definition is compared against the approved checksum in the table.
    e. If successful, the script modifies the path to the components in the definition file. At QA stage, the component of the definition is located under Engine/Components/QA/directory 258. In Production, the component is located under Engine/Prod/Live directory labeled 358 in FIG. 3. As a result, production definitions are defined to use production components only.

f. The script further checks if the component was deployed in the Production Engine. If so, its checksum is verified using compliance program 252 against checksum table that contains filenames and associated approved checksums.

g. If checksum test was successful, the script echoes the contents of the file to be stored in Security Log 128 database.

h. The script can also backup the current Live Definitions 350. A copy of Live can be created under the Engine/PID(provider implementation definition)/Prod folder or directory. For example, a new folder can be named BK.<date_HHMMSS>. The backup is saved with Root ownership.

i. The definition is copied with –p option to maintain file attributes from QA engine. For instance, step "e" and "i" can be performed by copying the definition to a temporary file in 358 from the development engine and then modifying the content of the copied temporary file to reflect the production component path. Thereafter, the output of the modification can be written a new file with the original file name.

j. Step e described above effectively invalidates the existing checksum in the Compliance Table 254 because two different files cannot have the same checksum by virtue of the HASH algorithm. Since the checksum was successful ahead of the modification, the controller script can also add a new entry in table 254 that reflects an updated checksum for the modified version.

The foregoing exemplary process for automated and controlled transfer of the automation case from the Development Engine 122 to the Production Engine can be further enhanced by automating the generation of a checksum in the event that automation case component contents are whitelisted or components contents are not blacklisted. If a component is gray, neither whitelisted nor blacklisted, then the system can be configured to prompt a manual action. More specifically, the compliance engine 252 can scan the component lines, extracting the commands, comparing each against a table of whitelisted or blacklisted commands. This table can be stored in PlatformImages 120, or Privileged Activities Management Server 115 if further control is required. The file representing the table can be protected by Root and a checksum. In addition, the compliance engine 252 can be configured such that all programs that are stored as components in the Engine or operating system commands that can be executed with Delegated Privileged commands are considered whitelisted.

Figure 4:
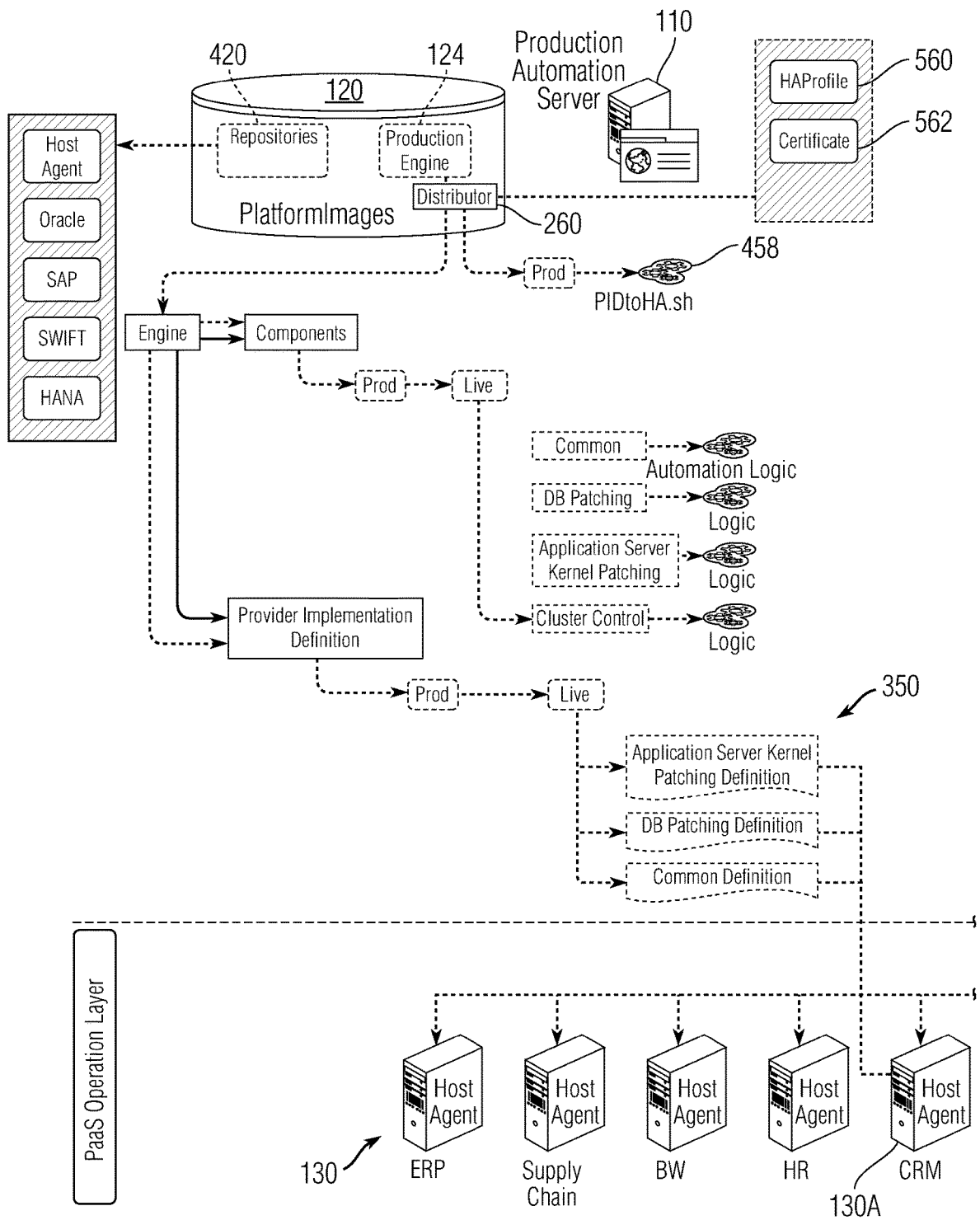
FIG. 4 is a block diagram illustrating an exemplary configuration of the PaaS automation control system and subroutine for PaaS automation control according to an embodiment of the present invention.

Production Deployment to Operation Rollout:

An exemplary process for production deployment control implemented using the system 100 is illustrated in the system and process flow diagram of FIGS. 3 and 4 and described next. While FIGS. 3 and 4 show components and definitions as logically linked to the development engine and production engine, respectively, it should be understood that the development engine and production engine share components and provider implementation definition directories. Accordingly, as shown in FIG. 3, the development engine comprises the QA directories 258, 256 and subdirectories, and the production engine comprises the Production directories 268, 266 and subdirectories.

Generally, in connection with production rollout, the definitions of Logical Units are rolled out to PaaS Cloud hosts and registered in their Host Agents. This Rollout Process enables the execution of logical units in the target PaaS cloud systems. The distribution is controlled by the system 100 according to a Predefined Privileged Command configured to, inter alia, check the username of the logical units to determine if it is Root and, if so, Root verify the corresponding checksum. If the checksum matches the one that was created according to the Root control workflow illustrated in FIG. 7A, the logical unit is distributed. Otherwise, it is not distributed.

More specifically, the rollout of a definition can be performed using a Delegated Privileged Command configured to check if the definition requires a Root username and, checks its checksum. If the verification is successful, the definition will be registered in the host agent with an appropriate permission that is protected by Root. This process can be initiated manually, for example, if the Automation Administrator 126 desires to activate the automation immediately in one or more specific hosts. Alternatively, the rollout can be automated by providing a command initiating rollout to a host agent such that the command is part of the host agent definitions and is provided in all hosts and whitelisted. In addition, Production Automation Server 110 can be programmed with a scheduled job that can be executed periodically and is defined to execute the rollout command. With such a configuration, all deployed definitions can be made available in all production cloud hosts. More specifically, an application can be running on top of the production Automation Server and the Production Automation Application Server communicates with host agents and orchestrates automation processes. As such, a rollout automation can be implemented using the system and distributed once manually. Furthermore, whenever there is a new automation deployment, the rollout can be performed automatically. In addition, as part of the provisioning of new cloud host, Production definitions can be added automatically to the new cloud host including Automation rollout.

With respect to production rollout, the system 100 is configured such that production definitions are rolled out to production Host Agents preferably after the deployment in Production Engine. As further described herein, the system 100 can be configured to achieve a production rollout in either of two modes. Ad hoc Rollout using Delegated Privileged Command or Automated scheduled rollout using an Automation Application Server which can be integrated with all Cloud Host Agents. Further discussion of the production rollout process is described herein with continued reference to FIG. 3 and FIG. 4.

Ad Hoc Rollout:

To rollout the definitions to specific hosts ahead of a system downtime, a Delegated Privileged Command called, for example, PIDtoHA.sh can be executed with the Broker program that communicates with Privileged Activities Management server 115. The script can be stored in PlatformImages 120 to make it available on all cloud servers. For instance, the script is stored under a Distributor folder, labeled as 260 in FIG. 4, of the PlatformImages shared filesystem. In an exemplary arrangement, the script can operate in either of two modes. In a first mode, the script is configured to ship all the contents of the folder Engine/PID/Prod/Live 350 to one or more of the host agents 130. In a second mode, the script is configured to ship only a specific file under Engine/PID/Live/350 based on the filename provided to the script. In connection with shipment, the script is configured to automatically perform the following operations:

1. Verify if the Host Agent is available in the target Host located in PaaS Operation Layer, say, host agent 130A. If not, it is installed automatically from binaries in the repositories. For example, the script can invoke a Host Agent Installation script which, for example, is called HAGTinstall.sh and stored in a Repositories 420 folder of PlatformImages 120. Repositories 420 can contain software packages required to install middleware applications and patch middleware applications.
2. If successful, the script further verifies if the folder for storing definitions is available in the target Host Agent 130A. If not, it can be created with Root ownership, by the script.
3. The script also verifies if a Host Agent Profile of the host agent 130A reflects the latest version. For instance, the latest version of the Host Agent profile 560 can be stored in the Distributor 260 folder inside PlatformImages 120 and matched against the Host Agent Profile of the host agent 130A using the script. If it does not match, the profile of the Host Agent can be updated, by the script, as Root using the latest profile 560.
4. The script can also verify if the Host Agent authentication PKI (Public Key Infrastructure) certificate is available in the host 130A to establish secure session with the Production Automation server 110. If not, the certificate can be uploaded, by the script, from the Distributor directory 260. The PKI certificate 562 can be stored in distributor 260 for verification against the host PKI certificate and for enabling secure ports e.g., HTTPs.
5. If successful, definitions in Engine/PID/Prod/Live can be scanned by the script. In connection with the scanning, if a username attribute for a given definition is determined to include a privileged user, for instance, Root, the script can invoke a Compliance program, which is shown as 252 in FIG. 3. The Compliance program can be invoked to verify the checksum of each definition against a respective checksum stored inside the compliance table 254 shown in FIG. 3. If there is a match for a given definition and the associated component in the definition, the definition can be copied to the host agent by the script.
6. Upon successful copying, a Host Agent Restart command can be invoked to reflect the latest updates.

Automated Scheduled Rollout During Block Time:

In addition or alternatively to the foregoing Ad-Hoc rollout process, the system 100 can be configured to perform a process for automated scheduled rollout during block time.

According to such a rollout approach, all approved updates in the Production Engine are distributed automatically by the system 100 to all cloud hosts using an Automation Application Server. The Automation Application server communicates with cloud servers through the host agent. Allowed actions or software components that can be executed by the Automation Application Server are defined through definitions inside Host Agent. In the exemplary configuration shown in FIG. 4, the Automation Application Server is hosted in the production automation server 110 which, like development automation server 105, is intended to represent a server and/or an operating system. For instance, as further described below, the Automation Application Server can comprise a J2EE application server that provides web user interface to simplify automation and orchestration of components.

The automated scheduled rollout during block time process involves a pre-defined and approved rollout routine, similar to the exemplary process for implementing a mass QA rollout operation. More specifically, the automated rollout process can include a pre-defined and automated invocation of a Delegated Privileged Command, for example, the command PIDtoHA.sh 458, shown in FIG. 4 under PlatformImages/Distributor/Prod. Whereas PIDQAtoHA.sh is used to push definitions in the Development Engine to lab servers, PIDtoHA.sh is used to rollout definitions from the Production Engine to the Production cloud servers used by customers. Each one of PIDQAtoHA.sh and PIDtoHA.sh is preferably defined under a different policy to enable controlled rollout to production. As such, the developer cannot update production Host Agents and only an Automation Administrator can update the Production Host Agent after the QA testing by developers in the lab. This segregation allows controlled rollout of definition to critical servers in the cloud. In addition, the certificate that is used to authenticate to Lab servers are preferably different from the certificate used to authenticate to production servers. The client certificate private key is stored in Automation Application Server. In addition, the Production Engine 124 can preferably be configured to include a previously deployed component that calls PIDtoHA.sh. Moreover, the definition for this component can be defined to be executed as Root and the component and definition are preferably previously approved, say, by an OS Administrator. As a result, in accordance with the exemplary PaaS automation and control methodology described herein, a checksum has been provided in the Compliance table 254 and the definition distributed to all cloud hosts using the ad hoc rollout approach. This definition can be available upon provisioning a new host agent automatically as further described herein in relation to an automated provisioning hook. In view of the foregoing, the Automated Scheduled Rollout During Block Time can be performed by the System 100 as follows:

1. Production Automation Application Server 110 is configured to communicate with all hosts 130 using Host Agents automatically in a mass mode using, for instance, a multithreading mechanism. Authentication between the device can be performed using a client certificate 562, which can be listed "as trusted" in the host agent profile 560. The communication can be over secure http, for example. The definition name is passed to host agent along with a request to execute an action on the target host or server. Host Agent can be further protected by allowing secure calls from the server hosting Production Automation Server 110. The kind of request to be executed is determined by the definition name and, in this example, the definition is the Sync PID definition. The Sync PID definition is available in Production Engine and the associated component of Sync PID is called SyncPID.sh, which is executed as root as specified in the definition. SyncPID.sh is also configured to accept a parameter to distinguish the call. For instance, if the call is coming from Development Automation Application Server, it executes PIDQAtoHA.sh and, otherwise, it executes PIDtoHA.sh. Both of these privileged commands are under the PlatformImages/Distributor area.
2. Once a request is received by host agent, say, host agent 130A, to execute according to the definition name passed to it from the Production Automation server 110, the host agent can be configured to read the definition name. Definitions in a host agent contains at least the required user name to execute the component and the component to be executed with its path. All components are located in PlatformImages 120.

3. In this case, the component is executed in the host using Root, wherein the Host Agent is running in the host with Root privileges. If the definition specifies a different user, the Host Agent can switch to the specified user. For instance, if a component is to be executed as Oracle, Host Agent switches the user to oracle and starts component execution accordingly.
4. The component is located in PlatformImages Engine 124. The components calls the aforementioned script PIDtoHA.sh, which is located in PlatformImages/Distributor 260.
5. PIDtoHA.sh performs steps 1 to 7 of the Ad Hoc Rollout approach described above. The Ad Hoc Rollout can be necessary if there is no host agent because if the host agent is not installed, then the Automation Application Server cannot communicate with the target host.

In one or more embodiments, the system 100 can be configured to provide a production cloud portal which is hosted by the Production Automation Server. Within the production cloud portal, an Automation Administrator 126 can configure an Automation Process. For instance, the Administrator can use the Development Configuration as a reference. Preferably, to minimize manual efforts and human errors, the system 100 can be configured to coordinate export and import of the Automation Process from the Development Cloud Portal. Accordingly, the Automation Process utilizes rolled out definitions of Engine Components as previously described. Documentation of the process, Developer name and Usage can also be described and managed by the system within the Automation Process metadata.

Figure 5:
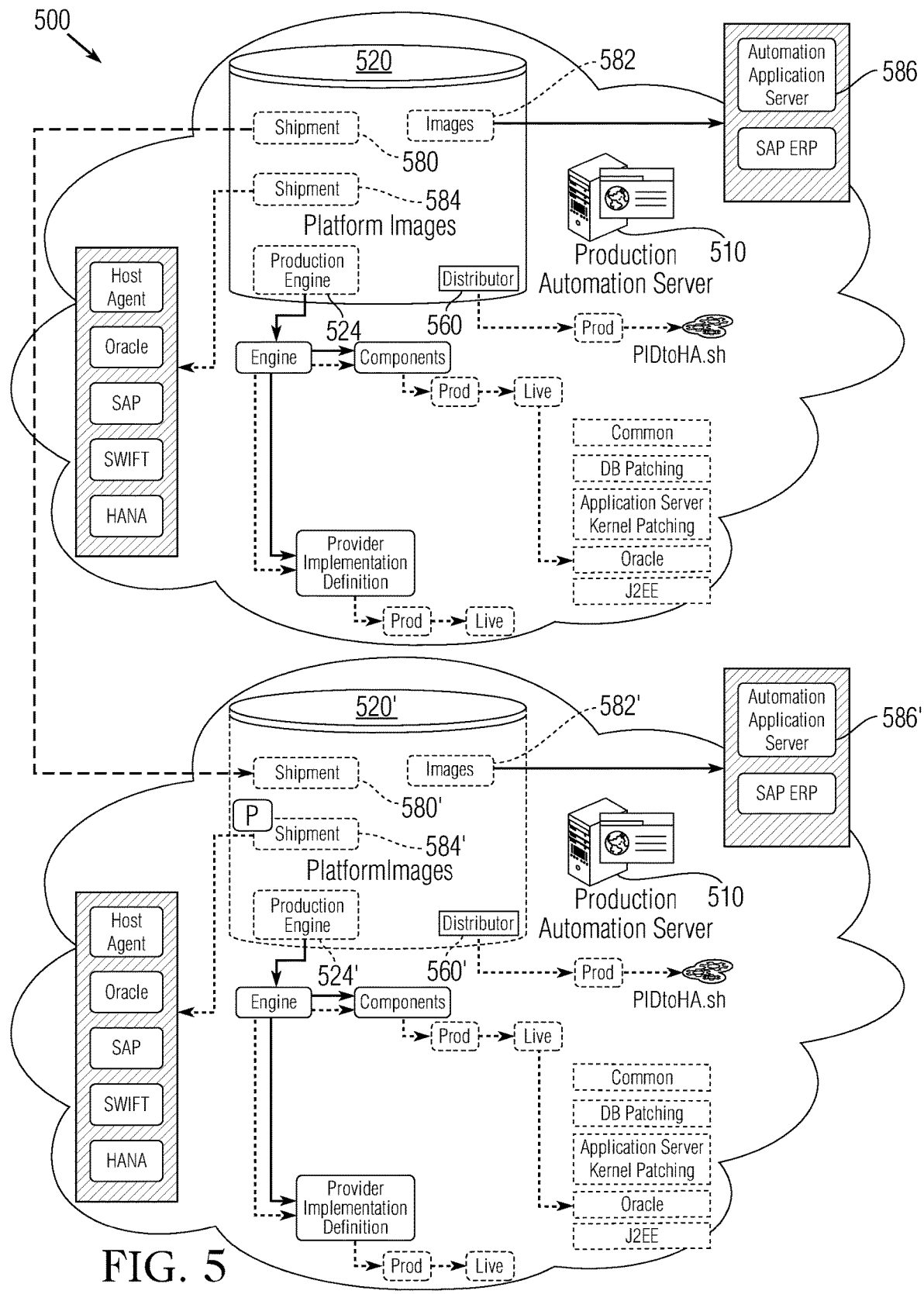
FIG. 5 is a block diagram illustrating an exemplary configuration of the PaaS automation control system and subroutine for PaaS automation control according to an embodiment of the present invention.

The exemplary system for PaaS automation control 100 can be configured to work under one cloud service provider or multiple cloud service providers. In particular, automation projects can be reflected and shipped to other cloud providers thereby providing portable and reusable automation projects. For example, if a cloud service provider is separating its infrastructure into multiple isolated zones at a hardware level, if there is a remote disaster recovery (DR), or if the service provider desires to package and sell middleware automation products to other cloud service provider, an automation can be provided for that purpose. As described above, PlatformImages 120 is preferably configured with storage that contains software packages and patches repositories, contains distributor commands, and contains QA and Production Engines that automate PaaS operation, patching and deployment of middleware applications. In addition, it contains the host agent installation package for preparing hosts in the cloud to use the systems and methods for PaaS automation control. The other key component in connection with production deployment is the Automation Application Server. FIG. 5 is a hybrid system and process flow diagram illustrating an exemplary implementation of system 100 for supporting multi-cloud operation. In FIG. 5, two cloud-based implementations of system 100 are shown including a cloud 1 system 500 and a clone, the cloud 2 system 500'.

Cloud 1 system includes a clone of automation application server 586 (without customer configurations), which is maintained in a directory, Images 582, inside PlatformImages 520. A clone represents an offline backup of Automation application Server database and the associated application server kernel and directories. In this exemplary arrangement, a LaMa Automation Application Server, which is based on J2EE, can be utilized. In this case, the image can be customized and renamed according to the customer needs. Automation Application Servers are considered middleware applications. Post handling of Images can vary from solution to solution.

By having PlatformImages 520 and a clone of the automation application server in a package, the complete automation system solution 500 can be shipped to cloud 2, 500', which is in an isolated zone, and rebuilt. This can be required to build the solution from scratch. To package the solution for this purpose, the following steps can be performed automatically:

1. The automation use case can be triggered upon receipt of a command via an Automation application server GUI. The use case can be implemented using the exemplary automation life cycle processes described above.
2. The component is executed as Root in the Production Automation Server 510.
3. The component calls a "Tar" Operating System command. The Tar command archives the complete Engine, Repositories 584, Images 582 and Distributor Commands 560. The Tar command can be configured to exclude local specific files including, for example, Certificate and HAProfiles that contains cloud private info (not shown).
4. Tar archive is stored in a directory inside PlatformImages called Shipment 580, for example.

Thereafter, the Shipment folder 580, which contains the tar archive, can be downloaded to cloud 2 500' from a cloud portal accessible by the customer of the system.

Another exemplary approach can be implemented for maintaining the PlatformImages in other clouds after it has been deployed. For instance, when the cloud service provider has built a solution once in his infrastructure and, after that, new automation use cases are developed and deployed, the PlatformImages folder can be packaged, shipped and extracted in the target cloud. To reflect the latest update in another zone, the latest shipment package can be uploaded in the other zone, particularly, into the Shipment directory 580' of cloud 2. An exemplary package shipment process can include the following steps:

1. Automation application server 586' in Cloud 2 triggers the UpdatePlatformImages.sh component, wherein UpdatePlatformImages.sh was part of the initial shipment to build the solution.
2. The component is executed with Root permission.
3. The component scans Shipment labeled as 580' to find Shipment archive and triggers extraction using, for example, tar with –xvp options.
4. All packages are extracted and updated within the cloud 2 system 500'.

As a result of the foregoing steps, cloud 2 is provided with the latest automation in Engine 524', Repositories 584', Images 582' and Distributor 560'. Automation models at Automation Application server can be exported to Shipment folder as well; as XML for instance. Models are imported in the target Production Automation Server in Cloud 2 and the new automations can be used accordingly.

Figure 6:
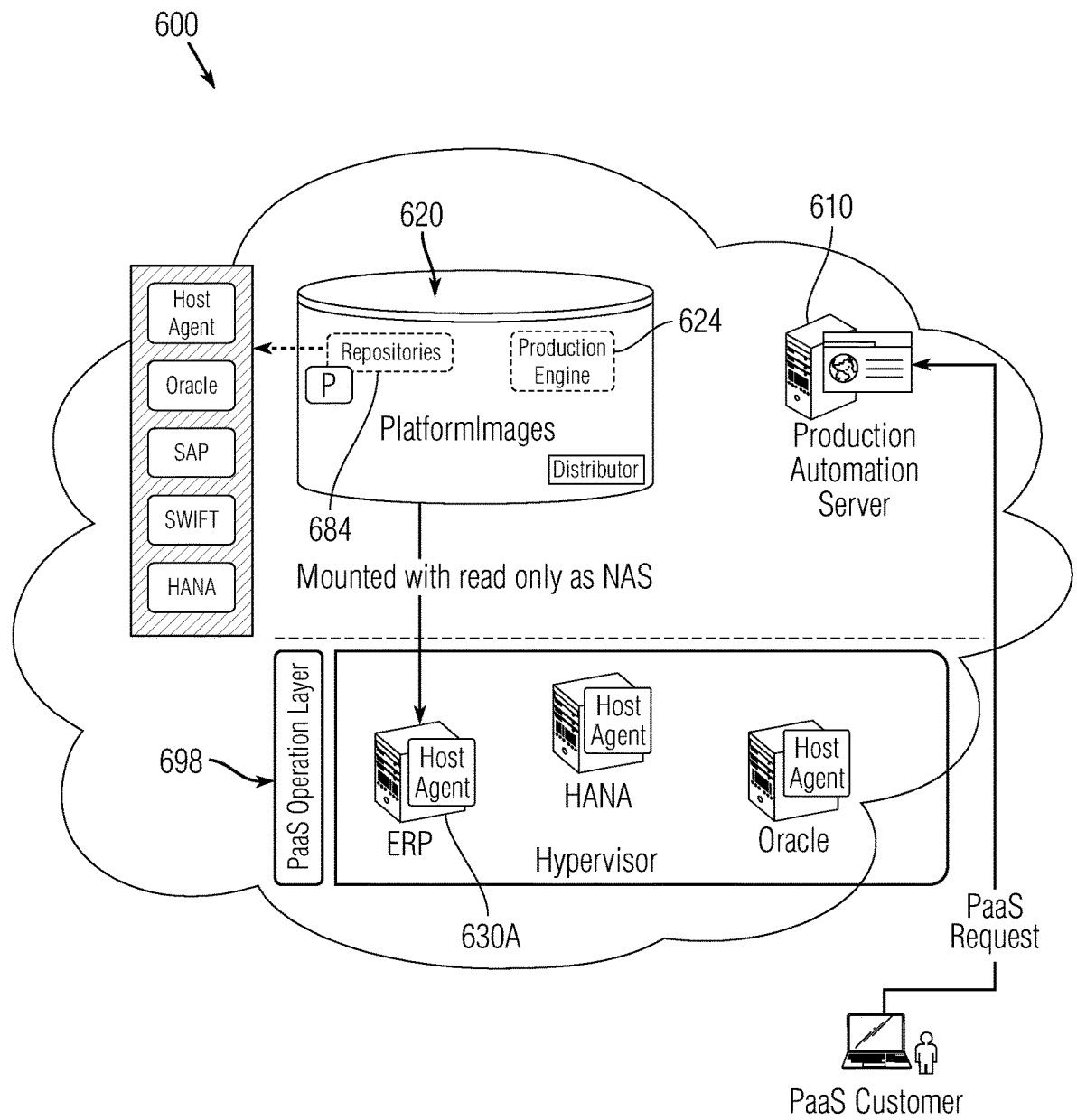
FIG. 6 is a block diagram illustrating an exemplary configuration of the PaaS automation control system and subroutine for PaaS automation control according to an embodiment of the present invention.

Turning briefly to FIG. 6, the exemplary PaaS automation control system 100 can be configured to support an existing cloud environment with existing hosts and resources. FIG. 6A is a block-diagram illustrating an implementation of the PaaS system 600 adapted for use with an existing system of cloud host agents shown in the PaaS operation layer 698. In such an exemplary scenario, after building an automation project using the PaaS automation system in connection with an existing cloud environment, newly provisioned virtual systems in the cloud can be automatically added or "hooked" to the existing system by the PaaS automation control system 100 according to the following steps:

1. In virtualized environments were hypervisor controls virtual resources, a script can be added as part of the provisioning post activities. The script is configured to automatically mount the network attached storage of PlatformImages 620 to the virtual resource with read only permission. The script can be run by the hypervisor solution. However, an API to the hypervisor can be established to trigger host provisioning from the Production Automation Application Server. As part of the provisioning process by the hypervisor, the script to prepare the new host for integration is executed by the hypervisor.
2. If successful, the script automatically calls Host Agent installation program located in the Repositories Area 684.
3. If successful the script calls PIDtoHA.sh script, described above, to perform Ad Hoc rollout of definitions to the new VM and prepares the target host agent, say host agent 630A, for Integration with the Automation Application Server (not shown).
4. If successful, the script restarts the host agent 630A.

As a result of the foregoing steps, the new host agent 630A can be discovered automatically by the automation application servers. Automation use cases can be executed in this new virtual machine after the discovery based on consumer or operator requirements. For example to install Oracle or HANA middleware.

In one or more embodiments, the exemplary PaaS automation control system 100 can be configured to achieve end-to-end automation of the system update, configuration and patching processes. In particular, the Automation Application Server can be integrated with Hypervisor technology such that the automation application server can provision a new virtual machine and deploy middleware automatically in a single process. For example, the provisioning of virtual machines can be achieved by calling APIs in the hypervisor. Then, the automation application server can be further configured to communicate with the exemplary Production Engine 124 in order to deploy middleware, apply latest patches and deliver it to PaaS customer in a single automated process. In addition, PlatformImages 120 filesystem can be automatically mounted in all operating system if there is a restart. For example, this can be defined in/etc/auto.direct and the configuration can be added during the provisioning process, as well.

Figure 7A:
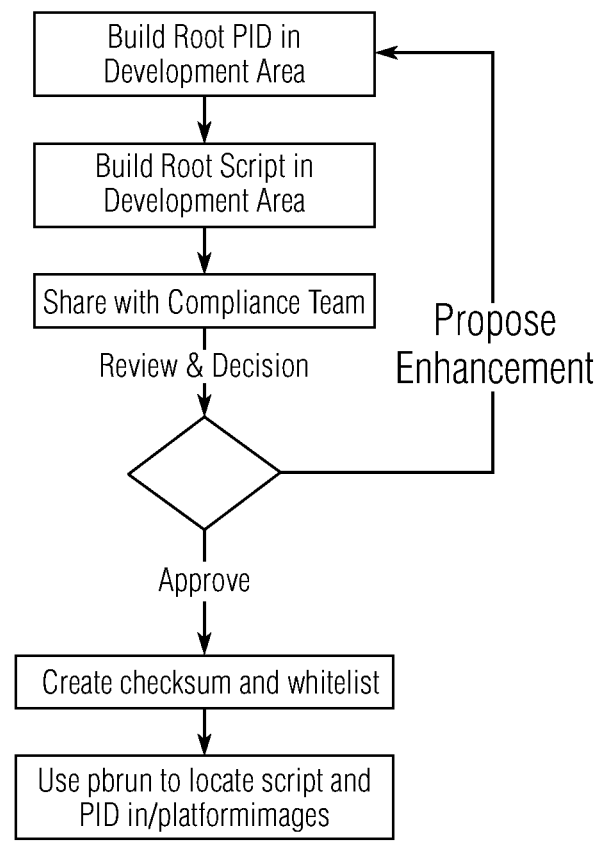
FIG. 7A is a flow chart illustrating an exemplary subroutine for PaaS automation control according to an embodiment of the present invention.

FIG. 7A is a process flow diagram illustrating an exemplary Root Control Workflow implemented by the PaaS automation control system 100. In particular, FIG. 7A illustrates additional steps that can be required to validate and approve privileged commands prior to executing them. Generally, the system 100 is configured such that a Root command or script is rejected in case of a vulnerability issue. Root has the power to shut down the server, modify host network configuration, delete or change audit log configuration, modify standard Operating System Configuration and delete data from filesystems. If a command does not touch these aspects, the system can be configured to accept the command. Otherwise, the system can be configured to propose an enhancement of the command. In one configuration, the check can be done manually by a System Administrator 126. However, the system 100 can be configured to verify a command against a list of blacklisted commands automatically. Preferably, this list is reviewed and updated periodically as technology is updated and new commands are introduced.

Figure 7B:
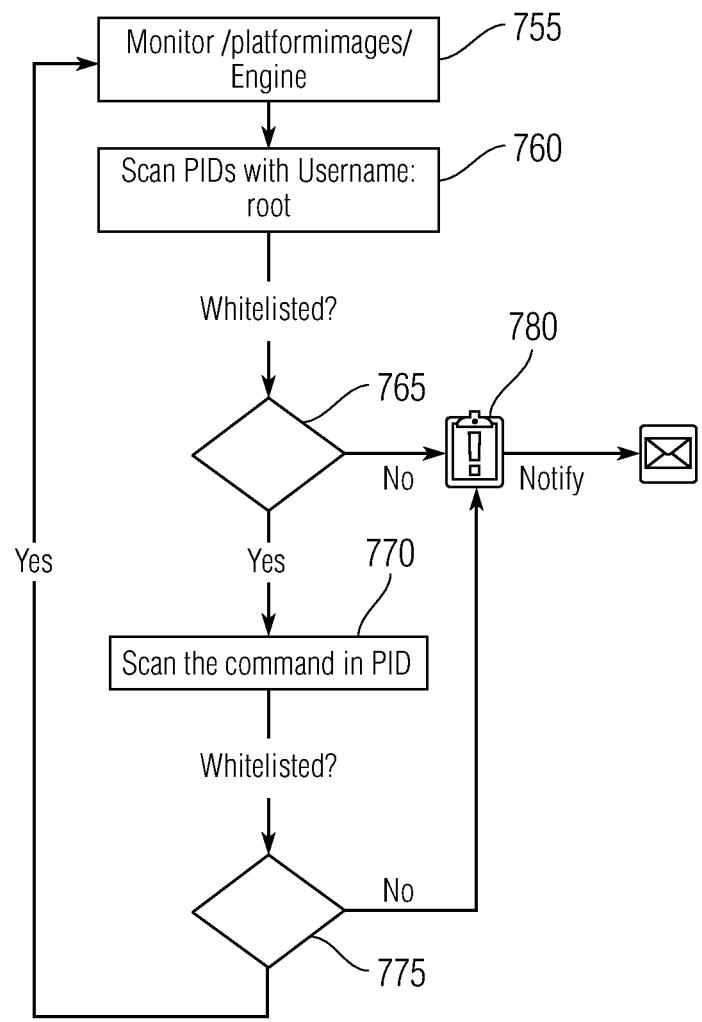
FIG. 7B is a flow chart illustrating an exemplary subroutine for PaaS automation control according to an embodiment of the present invention.

FIG. 7B is a process flow diagram illustrating additional control measures that can be established and implemented throughout the lifecycle of the PaaS automation process. Specifically, FIG. 7 illustrates steps of an exemplary Root-compliance enforcement process. The additional checks can serve to prevent any manipulation of the content using Privileged Account after deployment or rollout. As previously noted, the operations for advancing an automation case through the stages of the development and deployment process can be enhanced by automating the Root compliance generation of checksum in the event that automation case component contents are whitelisted or component contents are not blacklisted. More specifically, the compliance engine 252 can monitor the PlatformImages development and production engines at step 755 and scan the component lines and extract definitions and/or commands having a privileged user name, e.g., Root. At step 760 any definitions identified at step 755 can be compared against a table of whitelisted and/or blacklisted definitions. This table can be stored in PlatformImages 120, or Privileged Activities Management Server 115. In addition, the compliance engine 252 can be configured such that all programs that are stored as components in the Engine or operating system commands that can be executed with Delegated Privileged commands are considered whitelisted. If the definition is whitelisted, at step 770, commands in PID are scanned and are compared against a table of whitelisted or blacklisted commands at step 775.

Dual Integrity Monitor:

While Separation of Duties is effective in enforcing control over software units, it is not an absolute guarantee against unauthorized modifications of the software. For this reason, the system 100 is also configured to provide a Dual Integrity Monitor. Specifically, the system 100 can include a secret server, which executes code in one or more processors of the secret server and which is configured to run an Integrity Checksum Job to scan the Production Engine for any modifications. If any discrepancies are detected, all relevant data can then be automatically sent to a human Automation Administrator for investigation.

Figure 8:
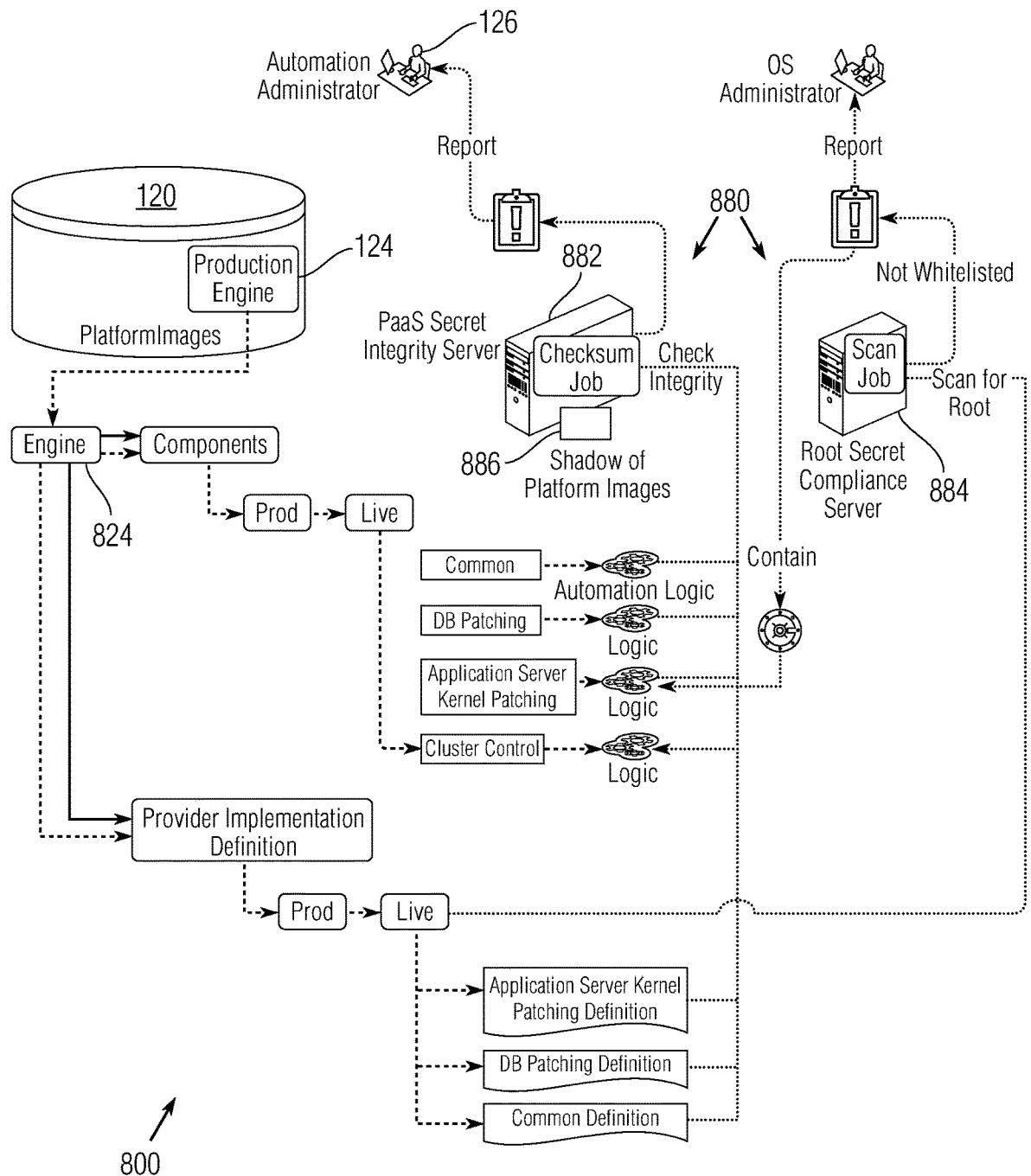
FIG. 8 is a block diagram illustrating an exemplary configuration of the PaaS automation control system and subroutine for PaaS automation control according to an embodiment of the present invention.

FIG. 8 is a block diagram illustrating an exemplary configuration of a PaaS automation system 800, which is based on system 100, and their interoperation in furtherance of an exemplary integrity control process. Generally, control is enforced through SoD as explained previously. In addition, the system 800 can be further configured to provide protection against unauthorized modification using a privileged username such as Root. For that reason, the system 800 can include one or more secret servers 880 which can be made accessible to the Automation Administrator. The secret server can include an integrity server component 882 and compliance server component 884. The secret server can also include checksum repositories of the Engine Content 824 of the Production Engine 124. The secret server 880 can be further configured to run an Integrity Checksum job in which the integrity server component 882 scans the Production Engine 124 for any modification. If, based on the checksums, a deviation is detected between a version provided in the Production Engine and the version stored within the secret server, the secret server can send an alert along with details to the Automation administrator for investigation purposes, as shown in FIG. 8. Additionally, access control can be enforced such that such an operation is executed using Automation account, wherein the account is protected and authorized only for Automation administrators.

More specifically, the system 800 can be configured to implement logic designed to mimic the structure of PlatformImages 120 in the secret server 880. The structure in the secret server is called a Shadow and the structure includes all directory branches, while the leaves represents the checksum file for the actual file in the PlatformImages 120. The check for integrity can be done periodically at the secret server, particularly the integrity server component 882, by comparing the current checksum of the file against the checksum in the shadow reflected in the secret server. If there is a mismatch, a report is sent to the automation administrator 126.

Since PlatformImages receives authorized updates using Delegated Privileged Commands, the checksums are also updated, as described above. For that reason, update jobs can be executed periodically to update the shadow automatically. Alternatively, an update job can be called on demand, manually. Preferably, the previous shadow is reserved and given date and timestamp of the modification.

An exemplary process for automatically building the shadow of PlatformImages by a "generator" module of the secret server 880 include the following steps:

1. The server 880, particularly the generator, checks if an existing shadow is already provided within the secret server. If yes, the shadow is backed up. The shadow folder is renamed by the script with a time stamp. The old shadow folder name is updated, say, appended with 'date+% Y–% m–% d. % H:% M:% S'
2. A new folder is created as the shadow, labeled 886 in FIG. 8.
3. The script scans the structure of PlatformImages 120 including Repositories, Engines, Distributor, Images and Shipments (not shown).
4. The directory structure of PlatformImages is reflected as a shadow inside the secret server.
5. Another scan is performed to detect files in all the directory structure.
    a. The checksum of each detected file in PlatformImages is calculated.
    b. A new file is created in the shadow. The same file name can be used with additional extension. For instance, an Md5sum OS command can be used for this purpose.
    c. The content of the file in the shadow can include the checksum and file path in PlatformImages, instead of the actual contents of the file. This avoids overloading the server with high storage requirements.

An exemplary process for automatically verifying the integrity of the PlatformImages performed by a "Validator" module of the secret server 880 can include the following steps:

1. The validator creates a new report file in the secret server. The report name can include, for example, date and time stamp details.
2. The validator scans the shadow structure for files.
3. Every detected file is read and the Checksum in the file is compared against the file in PlatformImages 120.
4. If mismatch is detected, a flag is set in a report file.
5. Once all files in the shadow are scanned, the report is scanned for flags and information relating to any flags are sent automatically to automation administrators.

Since PlatformImages is a critical component of the PaaS automation control system 100, the shared storage is preferably backed up periodically, say, on a daily basis. In one arrangement a full and incremental filesystem backup concept can be implemented and the retention period can be several months. In addition, the secret server filesystem that maintains data can be backed up on a daily basis in a central storage. The backup is encrypted using encryption key. Forensic Investigation may require old snapshots of the backup. By all of these controls, the system 100 is configured to mitigate automation risk and provides an acceptable level of Quality assurance and security control measures.

As noted, in one or more embodiments of the PaaS automation control system 100, Landscape Management (LaMa) Automation Application Server can be utilized. It should be understood that the invention is not restricted to Landscape Management (LaMa) technology. However, the PaaS automation control system is preferably configured to rely on agent based central automation meaning that there must be host agent on the managed servers, virtual machines, physical machines or mainframe in order to communicate with the Central Automation Application Server. The Automation Application Server is preferably configured to communicate with Host Agents to support operation of the PaaS automation control systems and methods. Automation Application Server provides modeling capability and inventory of cloud resources wherein operations can be executed on these defined resources. As would be understood, these resources can be servers or it can be applications or middleware applications installed these servers. In addition, multiple operations can be combined to define a process or orchestrate multiple operations. A single operation is reflected in the host agent by a definition, wherein a definition includes a component attribute which is executed from PlatformImages.

The system 100 is preferably configured such that Host Agents must run with privileged user in the target servers, e.g., Root in UNIX/LINUX. This is to give it the capability to switch between different users based on approved definitions that are rolled out inside the host agent by the system described in this invention.

Figure 9:
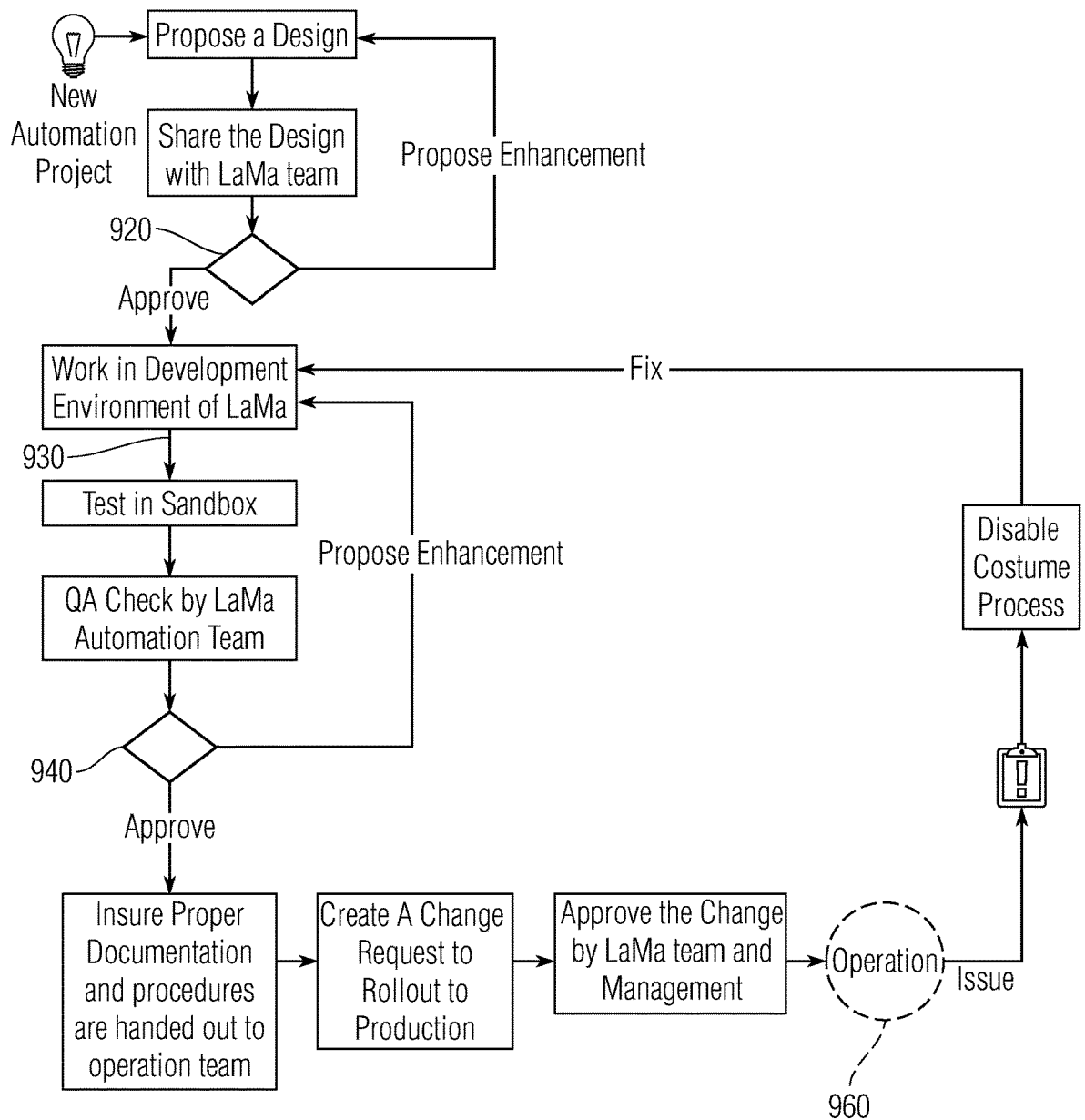
FIG. 9 is a flow chart illustrating an exemplary PaaS automation control lifecycle according to an embodiment of the present invention.
Figure 10:
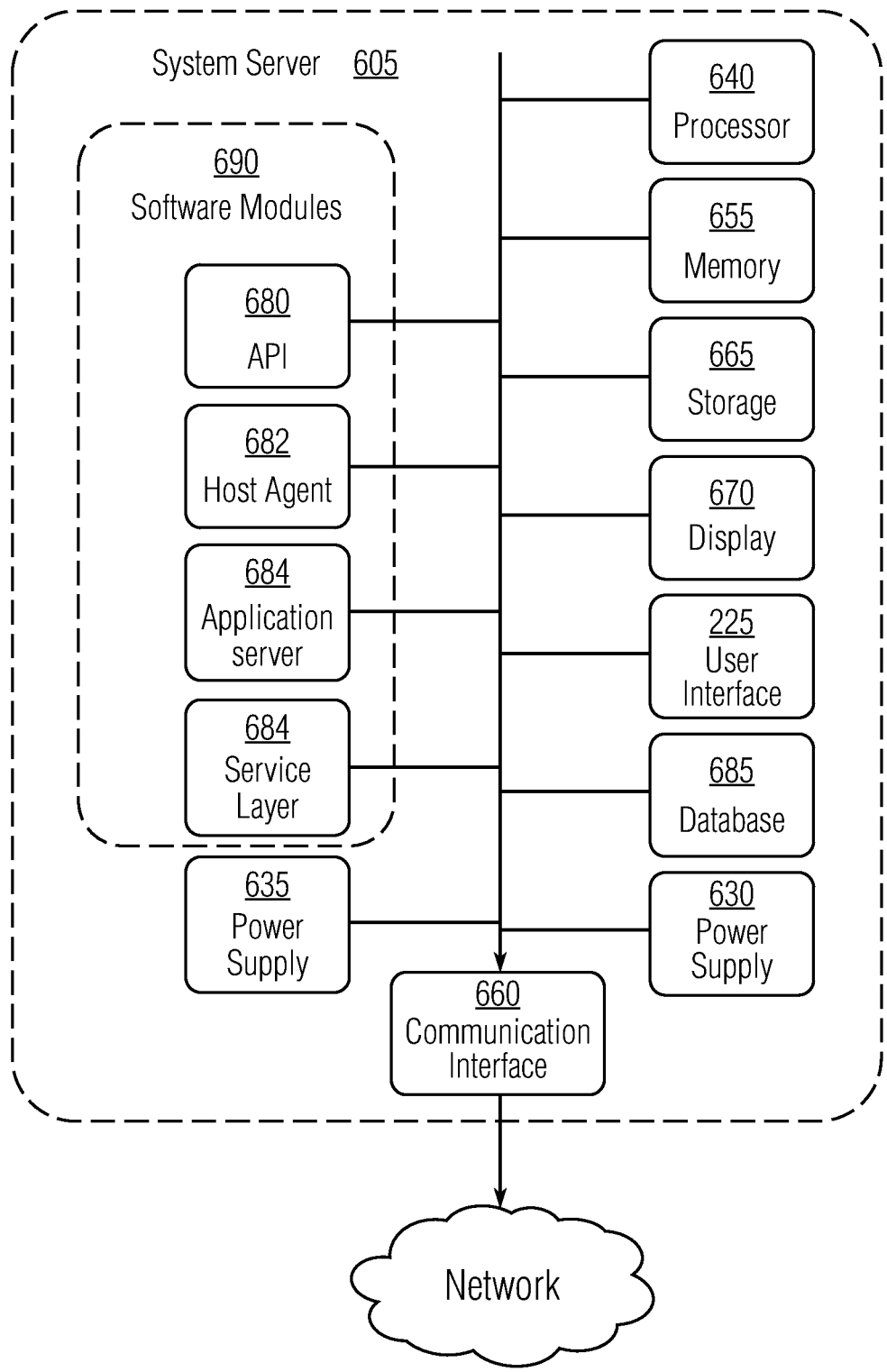
FIG. 10 is a block diagram illustrating exemplary hardware and software components of an exemplary computing device according to an embodiment of the present invention.

FIG. 9 is a high-level process-flow diagram illustrating the overall automation process workflow 900 performed using the system 100 and further illustrates the overall PaaS automation lifecycle. FIG. 9 identifies, among other steps, three main steps in which the system 100 controls the advance of an automation from one stage within the system 100 to the next stage toward production deployment. In particular, step 920 represents the routine(s) for controlled advancement of a project into the Development Engine 122 of the system 100. This exemplary routine is shown and described in connection with, for example, FIG. 2A. Step 930 represents the routines for controlled advancement of the project from development to QA testing, for example, as shown and described in connection with FIG. 2B. Step 940 represents the exemplary routines for controlled advancement of the project from the Development Engine to the Production Engine, for example, as shown and described in connection with FIG. 3. Step 960 represents the exemplary routines for controlled advancement of the project from the Production Engine to customer-system deployment, for example, as shown and described in connection with FIG. 4.

The exemplary system 100 is configured to implement various control measures in combination to provide a robust system capable of addressing various security concerns that historically hinder customers from adopting cloud computing. In particular, the system is configured to preferably perform a checksum-based verification to protect the integrity of both components and definitions at various stages. This can prevent various security flaws that would otherwise arise when an initial release of a component or a definition from the factory to an engine is assumed to be verified including, for example, the following security loophole: a malicious developer releases a definition of a component that is safe to execute with a privileged account; the developer then overwrites the definition to specify a non-privileged user and releases a malicious component of for that definition; then releases the original definition which has a checksum in the database. As a further example, attempts to modify a definition directly to bypass the security control can be detected by the checksum verification performed in connection with releasing the associated components.

To further enhance security, the secret server is provided to detect modification of both a component and definition directly without going through the security control. The secret server is also configured to detect unauthorized modification of the checksum table 254 and thereby protects the integrity of checksum table 254. In addition, the dual-integrity check serves to protect against situations where the complete security control system of root gets compromised. Moreover, the historical sequence of events are also protected in the security log 128 and audit checks are facilitated through backup of PlatformImages and Secret Servers to remote disks in an isolated and encrypted system. Moreover, proactive, reactive, SoD and monitoring control measures are implemented by the system to increase its robustness. The system also serves to maintain Chain of Custody records that can be used with confidence by an examiner in forensic investigation.

As noted, the functional blocks and computing devices of system 100 shown and described in connection with FIGS. 1-12 can be realized using one or more virtual computing modules or physical computing systems. Exemplary computing systems can include, for example, servers, blade servers, mainframes, and other appropriate computers and/or networked or cloud-based computing systems that are capable of communicating with remote computing devices, data storage devices and computing networks, including receiving, transmitting and storing electronic information, as well as processing information as further described herein. An exemplary configuration of a computing device is described in greater detail in connection with FIG. 13.

FIG. 11 is a block diagram illustrating an exemplary configuration of hardware and software components of an exemplary computing device 605. Components of the computing device include a processor 640, a memory 655, a communication interface 660 and a computer readable storage medium 665 that are accessible by the processor 640. The system 605 can also include or be coupled to a power source (not shown) source for powering the computing device. The processor 640 can also be coupled to a display 670, for visually outputting information to an operator (user), a user interface 675 for receiving operator inputs, as would be understood by those in the art.

The processor 640 serves to execute software instructions that can be loaded into the memory. The processor 640 can be implemented using multiple processors, a multi-processor core, or some other type of processor. The memory 655 is accessible by the processor 640, thereby enabling the processor to receive and execute instructions stored on the memory and/or on the storage. Memory 655 can be implemented using, for example, a random-access memory (RAM) or any other suitable volatile or non-volatile computer readable storage medium. In addition, memory 655 can be fixed or removable.

The storage medium 665 can also take various forms, depending on the particular implementation. For example, storage medium 665 can contain one or more components or devices such as a hard drive, a flash memory, a rewritable optical disk, a rewritable magnetic tape, or some combination of the above. The storage medium 665 also can be fixed or removable or remote such as cloud-based data storage systems (remote memory or storage configuration not shown). The storage, for example, can be used to maintain a database 630 (shown in FIG. 1A), which stores information and or data used or generated while carrying out operations and implementing aspects of the systems and methods disclosed herein.

One or more software modules 690 are encoded in the memory and/or storage medium. The software modules can comprise one or more software programs or applications having computer program code or a set of instructions executed in the processor 640. Such computer program code or instructions for carrying out operations and implementing aspects of the systems and methods disclosed herein can be written in any combination of one or more programming languages. While software modules are stored locally in storage or memory and execute locally in the processor 640, the processor can interact with remotely-based computing platform via a communication interface 660, and via a local or wide area network to perform calculations or analysis.

During execution of the software modules 685, the processor 640 is configured to perform the various operations of the system for PaaS control automation. The program code of the software modules 685 and one or more of the non-transitory computer readable storage devices (such as the memory and/or the storage) can form a computer program product that can be manufactured and/or distributed in accordance with the present disclosure, as is known to those of ordinary skill in the art. Among the software modules are an API module 680, a host agent module 682, an application server module 684 and a service layer module 684, as would be understood by those in the art.

Illustrative embodiments and arrangements of the present systems and methods provide a system and a computer implemented method, computer system, and computer program product for PaaS automation control. The flowchart and block diagrams in the Figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the Figures. For example, two blocks shown in succession can, in fact, be executed substantially concurrently, or the blocks can sometimes be executed in the reverse order, or one or more of the blocks can be repeated, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that any structural and functional details disclosed herein are not to be interpreted as limiting the systems and methods, but rather are provided as a representative embodiment and/or arrangement for teaching one skilled in the art one or more ways to implement the methods.

It should be understood that although much of the foregoing description has been directed to systems and methods for PaaS automation control, the systems methods disclosed herein can be similarly deployed in scenarios, situations, and settings beyond the referenced scenarios. For example, any type of structure or feature can be labeled and inspected using the exemplary systems and methods described herein. It should be further understood that any such implementation and/or deployment is within the scope of the system and methods described herein.

It is to be further understood that like numerals in the drawings represent like elements through the several Figures, and that not all components and/or steps described and illustrated with reference to the Figures are required for all embodiments or arrangements The terminology used herein is for the purpose of describing particular embodiments only and is not intended to be limiting of the disclosure. As used herein, the singular forms a, an and the are intended to include the plural forms as well, unless the context clearly indicates otherwise. It will be further understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of including, comprising, or having, containing, involving, and variations thereof herein, is meant to encompass the items listed thereafter and equivalents thereof as well as additional items.

While the disclosed invention has been described with reference to exemplary embodiments, it will be understood by those skilled in the art that various changes can be made and equivalents can be substituted for elements thereof without departing from the scope of the invention itself. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. ) A method for automating the rollout of software components in an enterprise-wide information technology platform, the method comprising:
   receiving, at a development automation server from a developer access point, a request calling a delegated privilege command (DPC) and identifying a developer and an automation project comprising components and definitions;
   verifying, by a privilege activities management server against a set of stored privilege policies that identify DPCs associated with respective privilege levels and identify users associated with the respective privilege levels that the developer has a privilege level sufficient for calling the DPC;
   releasing the components and definitions to a Development Engine in accordance with the DPC, wherein releasing step is performed by the development automation server in response to verifying the developer having a sufficient privilege level to call the first DPC;
   testing, using the Development Engine, the components and definitions through to a completed and linked set of components and definitions;
   releasing, by the development automation server in accordance with a second received DPC, the completed and linked set of components and definitions from the Development Engine to a Production Engine in response to verifying a user associated with the second DPC as having a privilege level that is sufficient to call the second DPC;
   deploying, using the production engine, the completed and linked components and definitions in a controlled testing environment to validate readiness for enterprise-wide deployment without human intervention; and
   implementing, by a production automation server, the enterprise-wide deployment of the completed and linked components and definitions from the production engine to an operation layer of an enterprise system in response to the readiness for enterprise-wide deployment being validated,
   wherein the step of verifying a received DPC further comprises:
      analyzing the associated definitions and components to identify any components or definitions requiring execution using a privileged username,
      calculating a respective checksum for each identified component or definition, and
      verifying, using a compliance program, that a respective name and calculated checksum for each identified component or definition matches entries in a previously stored list of names and respective checksums, and wherein release of a given identified component or definition is contingent upon verification of the respective name and calculated checksum.

2. The method of claim 1, wherein a component associated with the received DPC includes executable operations, and the method further comprising:
   analyzing components identified as requiring execution using a privileged username to identify any executable operations requiring execution using the privileged username;
   determining, according to one or more lists of approved executable operations, that the identified executable operations are either whitelisted or otherwise not blacklisted; and
   in response to determining that all executable operations in a given component are either whitelisted or not blacklisted, storing the name of the given component and a respective checksum in the stored list.

3. The method of claim 1, wherein the privileged username is usable to execute a plurality of executable operations and wherein a given privilege policy identifies a subset of executable operations among the plurality of executable operations that users associated with the given privilege policy has permission to call.

4. The method of claim 1, further comprising:
   generating the set of stored privilege policies.

5. The method of claim 1, wherein the step of releasing the components and definitions to the Development Engine in accordance with the DPC includes:
   modifying, by the development automation server, ownership of the identified components or definitions from a first username associated with the developer to the privileged username.

6. A system for automated deployment of software components in an enterprise-wide information technology platform having automated user privilege management, the system comprising:
   a privilege activities management (PAM) server storing a set of unique delegated privilege commands (DPCs), the PAM also maintaining a set of stored privilege policies that identify DPCs associated with respective privilege levels and identify users having the respective privilege levels, and wherein, based on any received DPC, the PAM is configured to determine whether a user calling the received DPC is identified in a stored privilege policy as having a sufficient privilege level for calling the received DPC;

a security log storage device configured to store records of operations performed by the system pursuant to any of the DPCs; and an administration system layer comprising:
  a development automation server (DAS), having at least one processor and at least one computer memory, the development automation server being configured to host a development area and configured coordinate release of an automation project comprising components and definitions from the development area to a development engine;
  a network attached storage component connectible to the DAS, the network attached storage component comprising:
    a development engine that is usable to define the automation project and test the automation project through to a completed and linked set of components and definitions,
    a production engine, configured to enable pre-rollout deployment of the completed and linked set of components and definitions in a controlled environment to validate readiness for enterprise-wide deployment without human intervention, and
  a production automation server, which automates the deployment of the completed and linked components and definitions from the production engine to an operation layer of the enterprise comprising one or more host agents in response to the readiness for enterprise-wide deployment being validated; and
wherein, in response to receipt of a request that calls a first DPC and identifies a developer and the automation project, the development automation server is configured to release the components and definitions of the automation project to the development engine in accordance with the first DPC, wherein releasing step is performed by the development automation server in response to verification by the PAM that the developer has a sufficient privilege level for calling the first DPC, and
wherein, in response to receipt of a request that calls a second DPC and identifies a user and the automation project, the development automation server is configured to release the completed and linked set of components and definitions from the development engine to the production engine in accordance with the second DPC, wherein releasing the completed and linked set of components and definitions to the production engine is performed by the development automation server in response to verification, by the PAM, that the user has a sufficient privilege level for calling the second DPC,
wherein the PAM is configured to verify each received DPC by:
  analyzing the components of the automation project identified by the received DPC to identify any components or definitions requiring execution using a privileged username,
  calculating a respective checksum for each identified component or definition, and
  verifying, using a compliance program, that a respective name and calculated checksum for each identified component or definition matches entries in a previously stored list of names and respective checksums, and wherein release or deployment of a given identified component or definition is contingent upon verification of the respective name and calculated checksum.

7. The system of claim 6, wherein each component includes executable operations and wherein, in response to a failure to verify the calculated checksum for an identified component, the PAM is configured to automatically validate the identified component and generate a checksum for storage in the list by:
  analyzing the identified component to identify any executable operations requiring execution using the privileged username;
  determining, according to one or more lists of approved executable operations, that the identified executable operations are either whitelisted or otherwise not blacklisted; and
  in response to determining that the executable operations in a given component are either whitelisted or not blacklisted, storing the name of the identified component and a respective checksum in the stored list.

8. The system of claim 6, wherein the privileged username is usable to execute a plurality of executable operations and wherein a given privilege policy among the set of privilege policies identifies a subset of executable operations among the plurality of executable operations that users associated with the given privilege policy has permission to call.

9. The system of claim 6, wherein the development automation server is configured to modify ownership of the identified components or definitions from a first username associated with the developer to a privileged username in connection with the release of the components and definitions of the automation project to the development engine.

10. A system for automated deployment of software components in an enterprise-wide information technology platform having automated user privilege management, the system comprising:
  a privilege activities management (PAM) server storing a set of unique delegated privilege commands (DPCs), the PAM also maintaining a set of stored privilege policies that identify DPCs associated with respective privilege levels and identify users having the respective privilege levels, and wherein, based on any received DPC, the PAM is configured to determine whether a user calling the received DPC is identified in a stored privilege policy as having a sufficient privilege level for calling the received DPC;
  a security log storage device configured to store records of operations performed by the system pursuant to any of the DPCs; and
  an administration system layer comprising:
    a development automation server (DAS), having at least one processor and at least one computer memory, the development automation server being configured to host a development area and configured coordinate release of an automation project comprising components and definitions from the development area to a development engine;
    a network attached storage component connectible to the DAS, the network attached storage component comprising:
      a development engine that is usable to define the automation project and test the automation project through to a completed and linked set of components and definitions, a production engine, configured to enable pre-rollout deployment of the completed and linked set of components and definitions in a controlled environment to validate readiness for enterprise-wide deployment without human intervention, and a production automation server, which automates the deployment of the completed and linked components and definitions from the production engine to an operation layer of the enterprise comprising one or more host agents in response to the readiness for enterprise-wide deployment being validated; and wherein, in response to receipt of a request that calls a first DPC and identifies a developer and the automation project, the development automation server is configured to release the components and definitions of the automation project to the development engine in accordance with the first DPC, wherein releasing step is performed by the development automation server in response to verification by the PAM that the developer has a sufficient privilege level for calling the first DPC, wherein, in response to receipt of a request that calls a second DPC and identifies a user and the automation project, the development automation server is configured to release the completed and linked set of components and definitions from the development engine to the production engine in accordance with the second DPC, wherein releasing the completed and linked set of components and definitions to the production engine is performed by the development automation server in response to verification, by the PAM, that the user has a sufficient privilege level for calling the second DPC; and a secret server configured to store a previously generated image of the production engine and periodically test for unauthorized modification of the production engine by comparing a checksum for the stored previously generated image to a checksum calculated from a current version of the production engine and generate an alert upon detection of unauthorized modification.

* * * * *